United States Patent
Falcone et al.

(10) Patent No.: US 6,569,929 B2
(45) Date of Patent: May 27, 2003

(54) METHOD TO PREPARE PHOSPHORAMIDES, AND RESIN COMPOSITIONS CONTAINING THEM

(75) Inventors: Neal Steven Falcone, Mystic, CT (US); John Robert Campbell, Clifton Park, NY (US); James Ross Fishburn, Menands, NY (US)

(73) Assignee: General Electric Company, Niskayuna, NY (US)

( * ) Notice: Subject to any disclaimer, the term of this patent is extended or adjusted under 35 U.S.C. 154(b) by 95 days.

(21) Appl. No.: 09/849,929

(22) Filed: May 4, 2001

(65) Prior Publication Data

US 2002/0019466 A1 Feb. 14, 2002

Related U.S. Application Data

(63) Continuation of application No. 09/404,458, filed on Jul. 8, 1999, now abandoned.
(60) Provisional application No. 09/235,677, filed on Jan. 22, 1999, now abandoned.

(51) Int. Cl.$^7$ ............................ C08K 5/49; C08K 5/52; C07D 241/04
(52) U.S. Cl. ..................... 524/122; 524/137; 524/140; 524/141; 524/146; 524/148; 524/151; 524/129; 544/398; 558/93; 558/200
(58) Field of Search ............... 544/398; 524/129, 524/122, 137, 140, 141, 146, 148, 151; 558/93, 200

(56) References Cited

U.S. PATENT DOCUMENTS

| | | |
|---|---|---|
| 2,682,521 A | 6/1954 | Coover, Jr. |
| 2,944,075 A | 7/1960 | Debo |
| 2,950,308 A | 8/1960 | Dunbar |
| 3,420,792 A | 1/1969 | Zuccaro |
| 3,429,850 A | 2/1969 | Holoch |
| 3,465,062 A | 9/1969 | Holoch et al. |
| 3,472,814 A | 10/1969 | Holoch |
| 3,483,271 A | 12/1969 | Holoch et al. |
| 3,524,908 A | 8/1970 | Redmore |
| 3,812,218 A | 5/1974 | Golborn et al. |
| 3,868,376 A | 2/1975 | Hotten |
| 3,891,667 A | 6/1975 | Lintzenich |
| 3,937,765 A | 2/1976 | Toy et al. |
| 4,086,302 A | 4/1978 | Morgan et al. |
| 4,094,929 A | 6/1978 | Nachbur et al. |
| 4,124,400 A | 11/1978 | Morgan et al. |
| 4,154,691 A | 5/1979 | Mauric et al. |
| 5,811,470 A | 9/1998 | Prindle, Jr. et al. |
| 5,973,041 A | 10/1999 | Campbell et al. |
| 6,221,939 B1 | 4/2001 | Campbell et al. |
| 6,228,912 B1 | 5/2001 | Campbell et al. |

FOREIGN PATENT DOCUMENTS

| | | |
|---|---|---|
| DE | 1694354 | 6/1971 |
| DE | 2505326 | 8/1975 |
| EP | 171730 | 2/1986 |
| EP | 372324 | 6/1990 |
| EP | 621297 | 10/1994 |
| EP | 728811 | 8/1996 |
| GB | 1517652 | 7/1978 |
| JP | 55135158 | 10/1980 |
| JP | 7-41655 | 2/1995 |
| JP | 7-70158 | 3/1995 |
| JP | 09071591 | 3/1997 |
| JP | 10175985 | 6/1998 |
| WO | WO 93/22373 | 11/1993 |
| WO | WO 93/22382 | 11/1993 |
| WO | WO 99/07779 | 2/1999 |

OTHER PUBLICATIONS

JJ Talley, "Preparation of Sterically Hindered Phosphoramidates", Journal of Chemical Engineering Data, vol. 33, pp. 221–222 (1988).

*Primary Examiner*—Kriellion A. Sanders
(74) *Attorney, Agent, or Firm*—Noreen C. Johnson; Christian G. Cabou

(57) ABSTRACT

The present invention relates to a method for preparing phosphoramides having a glass transition temperature in one embodiment of at least about 0° C., in another embodiment of at least about 10° C., and in still another embodiment of at least about 20° C., the phosphoramides being substantially free of acidic, basic, or halide impurities, or their precursors. The invention also relates to resin compositions comprising at least one thermoplastic resin and at least one phosphoramide having a glass transition temperature of at least about 0° C., wherein the phosphoramide is prepared by the method of the invention.

48 Claims, 1 Drawing Sheet

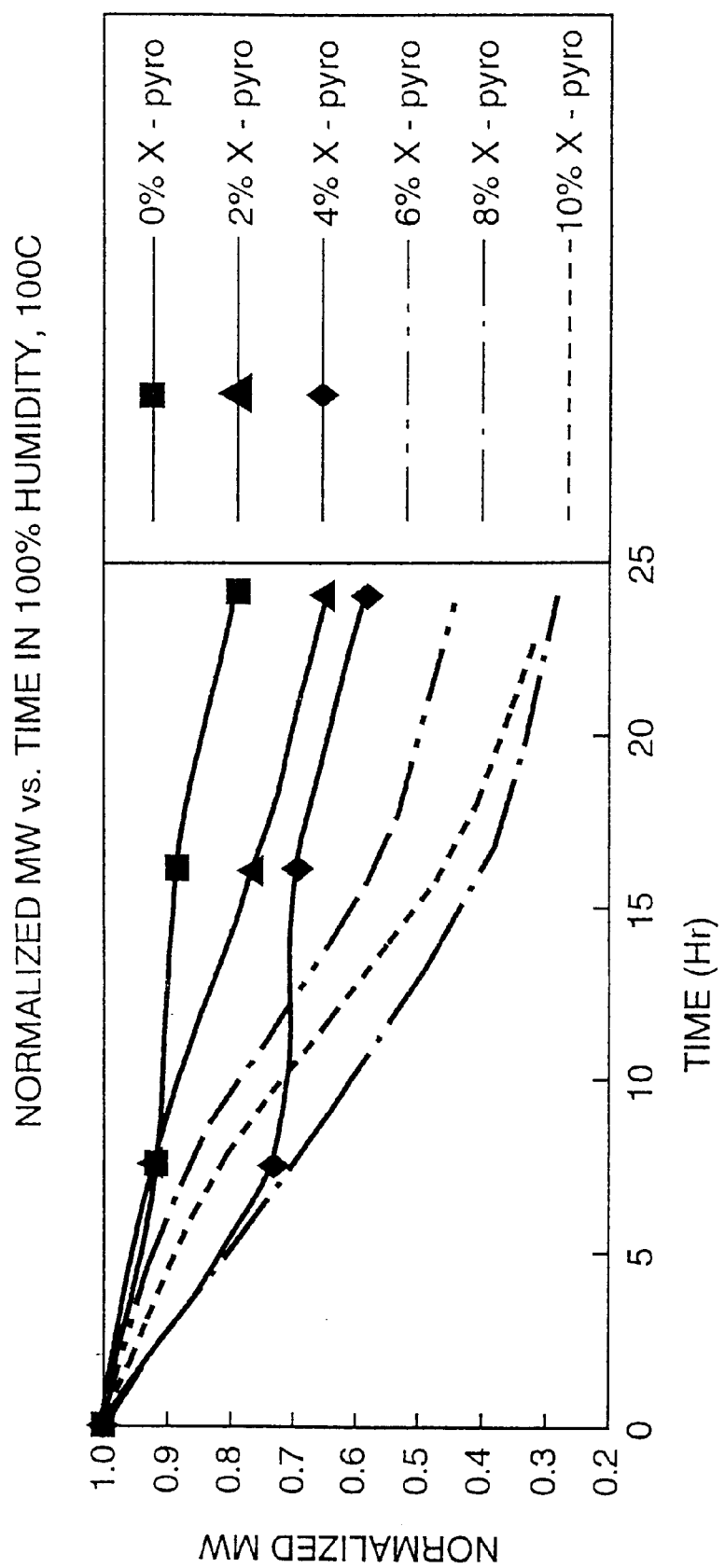

METHOD TO PREPARE PHOSPHORAMIDES, AND RESIN COMPOSITIONS CONTAINING THEM

This application is a continuation of application Ser. No. 09/404,458, filed Jul. 8, 1999 Now Abandoned, which is a continuation-in-part of application Ser. No. 09/235,677, filed Jan. 22, 1999, now abandoned.

BACKGROUND OF THE INVENTION

The present invention relates to a method for preparing phosphoramides substantially free of acidic, basic, or halide impurities, or their precursors. The invention also relates to resin compositions comprising at least one thermoplastic resin and at least one phosphoramide having a glass transition temperature of at least about 0° C., wherein the phosphoramide is prepared by the method of the invention.

Compounds containing phosphorus have been used in resin compositions for a variety of reasons. For example, various phosphites have been utilized to enhance the melt stability and/or color stability of resin compositions. Alternatively, various organic phosphate esters have been utilized in resin compositions to improve the flame resistance properties of the compositions and/or to enhance the melt flow characteristics of the compositions. Certain water soluble phosphoramides have also been used in the textile industry as flame retardant finishes for fabrics.

As part consolidation and weight reduction continues to evolve in many industries, the physical property demands placed upon resin manufacturers are increasing. Key industries increasing the demands include the electronics and computer industries, especially for computer housings, computer monitor housings, and printer housings. One increasing demand is for materials that possess higher heat resistance while substantially retaining other key physical properties. Another increasing demand is for materials that are rated in the Underwriter's Laboratory UL-94 test protocol as V-0, V-1, or V-2.

Resinous compositions containing phosphoramides are known which meet many of these property requirements. However, acidic, basic, or halide species, or their precursors present as impurities in phosphoramides often result in deleterious effects on resin composition properties such as molecular weight loss in one or more resinous components. There is a need for phosphoramides substantially free of acidic, basic, or halide impurities (or their precursors) for use in preparing new resin compositions that meet stringent property requirements such as flame retardancy, heat resistance, and hydrolysis resistance

SUMMARY OF THE INVENTION

In one embodiment the present invention is a method for preparing a sterically hindered phosphoramide having a glass transition temperature in one embodiment of at least about 0° C., which comprises contacting a sterically hindered diaryl chlorophosphate with a basic nitrogen compound containing at least two basic N—H groups, wherein the reaction is conducted with substantial elimination of water such that less than about 2 wt. % of pyrophosphate is formed based on the weight of phosphoramide. In another embodiment the present invention is directed to a resin composition comprising the following and any reaction products thereof: a) at least one thermoplastic resin, and b) at least one phosphoramide having a glass transition point of at least about 0° C., wherein the phosphoramide is made by the method which comprises contacting a sterically hindered diaryl chlorophosphate with a basic nitrogen compound containing at least two basic N—H groups, wherein the reaction is conducted with substantial elimination of water such that less than about 2 wt. % of pyrophosphate is formed based on the weight of phosphoramide. Various other features, aspects, and advantages of the present invention will become more apparent with reference to the following description and appended claims.

BRIEF DESCRIPTION OF THE DRAWINGS

The advantages of embodiments of this invention will become further apparent upon consideration of the following description, taken in conjunction with the accompanying drawings, wherein:

FIG. 1 shows the normalized molecular weight change versus time in a bisphenol A polycarbonate portion of a bisphenol A-ABS blend containing various levels of X-PYRO after exposure of test parts to conditions of 100% relative humidity and 100° C.

DETAILED DESCRIPTION OF THE INVENTION

In various embodiments the present invention relates to a method for preparing sterically hindered phosphoramides having a glass transition temperature in one embodiment of at least about 0° C., in another embodiment of at least about 10° C., and in still another embodiment of at least about 20° C., the phosphoramides being substantially free of acidic, basic, or halide impurities, or their precursors. In another embodiment the present invention is a method for preparing a sterically hindered phosphoramide which comprises contacting a sterically hindered diaryl chlorophosphate with a basic nitrogen compound containing at least two basic N—H groups, wherein the reaction is conducted with substantial elimination of water such that less than about 2 wt. % of pyrophosphate is formed based on the weight of phosphoramide.

Phosphoramides of the present invention have a glass transition temperature of in one embodiment at least about 0° C., in another embodiment of at least about 10° C., and in another embodiment of at least about 20° C. In various embodiments suitable phosphoramides may be represented by the formula I:

(I)

wherein $Q^1$ is oxygen or sulfur; $R^1$ is an amine residue, and $R^2$ and $R^3$ are each independently an alkyloxy, alkylthio, aryloxy, or arylthio residue, or an aryloxy or arylthio residue containing at least one alkyl or halogen substitution, or mixture thereof; or an amine residue, said phosphoramide being substantially free of acidic, basic, or halide impurities, or their precursors.

In one embodiment phosphoramides of useful molecular structure may be prepared by the reaction of a corresponding amine such as, for example, piperazine or N,N'-dimethylethylenediamine with a diaryl chlorophosphate (or the corresponding thiophosphate) in the presence of a tertiary amine. This method of preparation is described in Talley, *J. Chem. Eng. Data*, 33, 221–222 (1988) and leads to specific phosphoramide compounds without repeating units.

Alternatively, phosphoramides may be prepared by the reaction of the corresponding amine with phosphoryl chloride in the presence of a base (such as a tertiary amine), with the desired hydroxyl- or thiohydroxy-containing compound added simultaneously or subsequently to the addition of the amine. Addition of a diamine or triamine to phosphoryl chloride with simultaneous or subsequent addition of a hydroxyl or thiohydroxy-containing compound is believed to lead to repeating units of phosphoramide, often of 1 to about 5 phosphoramide linkages per compound. Similarly, addition of a diamine or triamine to a monosubstituted phosphoryl- or thiophosphoryl dichloride with simultaneous or subsequent addition of hydroxyl- or thiohydroxy-containing compound is also believed to lead to repeating units of phosphoramide. Thiophosphoryl chloride may be substituted for phosphoryl chloride in the above preparations to provide suitable phosphoramides.

Depending upon the manner in which they are prepared, isolated, and purified, phosphoramides may contain various impurities, such as acidic, basic, and halide impurities, or their precursors. Representative acidic impurities include, but are not limited to, phosphoric acids and tertiary amine hydrohalides. Representative precursors to acidic impurities include, but are not limited to, phosphoryl chlorides and pyrophosphates, which may be readily hydrolyzed to phosphoric acids. Representative basic impurities include, but are not limited to, secondary and tertiary amines. Representative precursors to basic impurities include, but are not limited to, tertiary amine hydrohalides. Representative halide impurities include, but are not limited to, chloride or bromide derived from tertiary amine hydrohalides or phosphoryl halides, or catalyst residues.

A particular impurity is the pyrophosphate derived from reaction of two moles of disubstituted phosphoryl halide with water in a phosphoramide reaction mixture, or in isolation or purification of a phosphoramide product. For example, two moles of dixylylphosphoryl chloride may react with water to produce tetraxylyl pyrophosphate (hereinafter referred to as X-PYRO) and two moles of hydrochloric acid. Pyrophosphates may react further with water in a phosphoramide reaction mixture, or in isolation or purification of a phosphoramide product, or subsequently in the resinous compositions embodied in the present invention, to produce two moles of the corresponding phosphoric acid.

The presence of any acidic, basic, or halide impurities, or their precursors in resinous compositions containing phosphoramides may have a detrimental effect on certain composition properties. For example, molded parts of said compositions may show deterioration in one or more of mechanical properties (such as loss of impact strength), optical properties (such as increasing haze), thermal properties, hydrolytic stability, and the like. Although various mechanisms may be responsible for any deterioration in composition properties, one mechanism is the degradation in the molecular weight of at least one resinous component in the composition. Common examples include the degradation in the molecular weight of condensation polymers, including, but not limited to, polyesters, polyamides, and polycarbonates, in the presence of acidic, basic, or halide impurities. In particular, polycarbonate molecular weight may be sensitive to all these types of impurities, and the properties of polycarbonate-containing compositions may be adversely affected by their presence. Illustrative, non-limiting polycarbonate compositions include polycarbonate-SAN blends; polycarbonate-ABS blends; polycarbonate-polyester blends; and compositions containing essentially polycarbonate as the resinous component.

Acidic, basic, or halide impurities, and their precursors may be removed from phosphoramide products of the present invention by means commonly know in the art, including, but not limited to, distillation, recrystallization, solvent extraction, devolatilization, and like methods. It is also beneficial to prevent the formation of acidic, basic, or halide impurities and their precursors during the synthesis of phosphoramides. The present inventors have found that the substantial elimination of water from reaction mixtures to form phosphoramides of the present invention leads to a decrease in certain impurities, including pyrophosphates. Substantial elimination of water means that the amount of water present in a reaction mixture to prepare a phosphoramide is such that in one embodiment less than about 2 wt. % of pyrophosphate is formed, in another embodiment less than about 1 wt. % of pyrophosphate is formed, in another embodiment less than about 0.5 wt. % of pyrophosphate is formed, in still another embodiment less than about 0.2 wt. % of pyrophosphate is formed, and in still another embodiment less than about 0.1 wt. % of pyrophosphate is formed based on the weight of phosphoramide. Substantial elimination of water may be attained by means known in the art including, but not limited to, one or more steps comprising drying the reagents and solvents employed, employing reagent-grade solvents, and performing the reaction under an inert atmosphere. Resinous compositions containing phosphoramides made by the method of the invention and substantially free of acidic, basic, or halide impurities and their precursors have typically have excellent properties, including retention of various properties under harsh environmental conditions. For example such resinous compositions have excellent hydrolytic stability and corresponding retention of resin molecular weight, which is often reflected in retention of mechanical properties such as impact strength, tensile properties, or environmental stress crack resistance. Thus, in one embodiment substantially free of acidic, basic, or halide impurities and their precursors means that a resinous component in a composition containing at least one phosphoramide made by the method of the present invention does not show significant deterioration in molecular weight with time under conditions of high temperature and humidity compared to a resinous component in a composition not containing said phosphoramide tested under similar conditions. In one embodiment conditions of temperature are greater than 70° C. and humidity greater than 70% relative humidity. In another embodiment conditions of temperature are greater than 90° C. and humidity greater than 90% relative humidity. In still another embodiment conditions of temperature are about 100° C. and humidity about 100% relative humidity.

In various embodiments phosphoramides made by the method of the present invention comprise a phosphoramide having a glass transition temperature in one embodiment of at least about 0° C., in another embodiment of at least about 10° C., and in still another embodiment of at least about 20° C., of the formula VI:

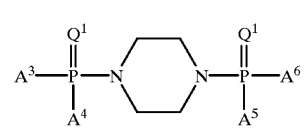

(VI)

wherein each $Q^1$ is independently oxygen or sulfur; and each of $A^{3-6}$ is independently an alkyloxy, alkylthio, aryloxy, or arylthio residue, or an aryloxy or arylthio residue containing at least one alkyl or halogen substitution, or mixture thereof; or an amine residue, said phosphoramide being substantially free of acidic, basic, or halide impurities, or their precursors. In one embodiment each $Q^1$ is oxygen, and each $A^{3-6}$ is an aryloxy moiety with at least one aryloxy moiety having at least one substituent on an aromatic ring ortho to the oxygen linkage. In another embodiment each $Q^1$ is oxygen, and each $A^{3-6}$ moiety is independently an aryloxy moiety with at least one substituent on each aromatic ring ortho to the oxygen linkage, optionally further substituted. In still another embodiment each $Q^1$ is oxygen, and each $A^{3-6}$ moiety is independently an aryloxy moiety with at least two substituents on each aromatic ring ortho to the oxygen linkage, as for example a 2,6-disubstituted phenoxy moiety, optionally further substituted. In various embodiments substituents may be $C_{1-8}$ straight-chain or branched alkyl, or halogen. In still another embodiment of the invention, each $Q^1$ is oxygen, and each $A^{3-6}$ moiety is independently phenoxy, 2,6-dimethylphenoxy, 2,3,6-trimethylphenoxy, or 2,4,6-trimethylphenoxy. In yet still another embodiment of the invention, each $Q^1$ is oxygen, and all $A^{3-6}$ moieties are phenoxy, 2,6-dimethylphenoxy, 2,3,6-trimethylphenoxy, or 2,4,6-trimethylphenoxy. These phosphoramides are piperazine-type phosphoramides. In the above formula wherein each $Q^1$ is oxygen, and each $A^{3-6}$ moiety is a 2,6-dimethylphenoxy moiety, the glass transition temperature of the phosphoramide is about 62° C. and the melting point is about 192° C. Also, in the above formula wherein each $Q^1$ is oxygen, and each $A^{3-6}$ moiety is a 2,3,6-trimethylphenoxy moiety, the glass transition temperature of the phosphoramide is about 61° C. and the melting point is about 237–239° C. Also, in the above formula wherein each $Q^1$ is oxygen, and each $A^{3-6}$ moiety is a 2,4,6-trimethylphenoxy moiety, the glass transition temperature of the phosphoramide is about 74° C. and the melting temperature is about 233–234° C. Conversely, in the above formula wherein each $Q^1$ is oxygen, and each $A^{3-6}$ moiety is phenoxy, the glass transition temperature of the phosphoramide is about 0° C. and the melting point is about 188° C. It was unexpected that the glass transition temperature would be so high for a sterically hindered phosphoramide of formula VI where each $Q^1$ is oxygen, and wherein each of $A^{3-6}$ is a 2,6-dimethylphenoxy moiety (i.e. about 62° C.) as compared to the glass transition temperature of the corresponding phosphoramide of formula VI wherein each $Q^1$ is oxygen, and each of $A^{3-6}$ is a phenoxy moiety (i.e. about 0° C.), especially since the melting points for the phosphoramides differ by only about 4° C. For comparison, the glass transition temperature of tetraphenyl resorcinol diphosphate is about −38° C. It is also possible to make phosphoramides with intermediate glass transition temperatures by using a mixture of various substituted and non-substituted aryl moieties within the phosphoramide.

In another embodiment, phosphoramides made by the method of the present invention comprise a phosphoramide having a glass transition temperature in one embodiment of at least about 0° C., in another embodiment of at least about 10° C., and in still another embodiment of at least about 20° C., of the formula VII:

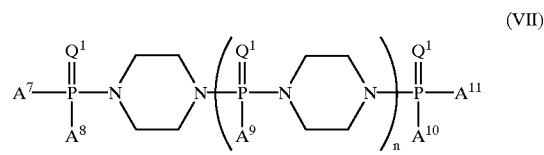

(VII)

wherein each $Q^1$ is independently oxygen or sulfur; and each of $A^{7-11}$ is independently an alkyloxy, alkylthio, aryloxy, or arylthio residue, or an aryloxy or arylthio residue optionally containing at least one alkyl or halogen substitution, or mixture thereof; or an amine residue; and n is from 0 to about 200. In one embodiment each $Q^1$ is oxygen, and each $A^{7-11}$ moiety is independently phenoxy or a substituted phenoxy moiety. In another embodiment each $Q^1$ is oxygen, and each $A^{7-11}$ is an aryloxy moiety with at least one aryloxy moiety having at least one substituent on an aromatic ring ortho to the oxygen linkage. In a still another embodiment each $Q^1$ is oxygen, and each $A^{7-11}$ moiety is independently an aryloxy moiety with at least one substituent on each aromatic ring ortho to the oxygen linkage, optionally further substituted. In a still another embodiment each $Q^1$ is oxygen, and each $A^{7-11}$ moiety is independently an aryloxy moiety with at least two substituents on each aromatic ring ortho to the oxygen linkage, as for example a 2,6-disubstituted phenoxy moiety, optionally further substituted. In various embodiments substituents are $C_{1-8}$ straight-chain or branched alkyl, or halogen. In one embodiment of the invention, each $Q^1$ is oxygen, and each $A^{7-11}$ moiety is independently phenoxy, 2-methylphenoxy, 2,6-dimethylphenoxy, 2,3,6-trimethylphenoxy, or 2,4,6-trimethylphenoxy, and n is from 0 to about 5. In another embodiment of the invention, each $Q^1$ is oxygen, and all $A^{7-11}$ moieties are phenoxy, 2-methylphenoxy, 2,6-dimethylphenoxy, 2,3,6-trimethylphenoxy, or 2,4,6-trimethylphenoxy, and n is from 0 to about 5.

In another embodiment of the invention phosphoramides made by the method of the present invention comprise a phosphoramide having a glass transition temperature in one embodiment of at least about 0° C., in another embodiment of at least about 10° C., and in still another embodiment of at least about 20° C., of the formula VII:

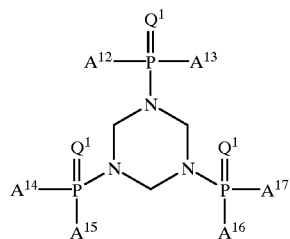

(VIII)

wherein each $Q^1$ is independently oxygen or sulfur; and each of $A^{12-17}$ is independently an alkyloxy, alkylthio, aryloxy, or arylthio residue, or an aryloxy or arylthio residue optionally containing at least one alkyl or halogen substitution, or mixture thereof; or an amine residue. In one embodiment each $Q^1$ is oxygen, and each $A^{12-17}$ moiety is independently phenoxy or a substituted phenoxy moiety. In another embodiment each $Q^1$ is oxygen, and each $A^{12-17}$ is an aryloxy moiety with at least one aryloxy moiety having at least one substituent on an aromatic ring ortho to the oxygen linkage. In a still another embodiment each $Q^1$ is oxygen, and each $A^{12-17}$ moiety is independently an aryloxy moiety with at least one substituent on each aromatic ring ortho to the oxygen linkage, optionally further substituted. In yet still another embodiment each $Q^1$ is oxygen, and each $A^{2-17}$ moiety is independently an aryloxy moiety with at least two substituents on each aromatic ring ortho to the oxygen linkage, as for example a 2,6-disubstituted phenoxy moiety, optionally further substituted. In various embodiments substituents are $C_{1-8}$ straight-chain or branched alkyl, or halogen. In one embodiment of the invention, each $Q^1$ is oxygen, and each $A^{12-17}$ moiety is independently phenoxy, 2-methylphenoxy, 2,6-dimethylphenoxy, 2,3,6-trimethylphenoxy, or 2,4,6-trimethylphenoxy. In another embodiment of the invention, each $Q^1$ is oxygen, and all $A^{12-17}$ moieties are 2-methylphenoxy, 2,6-dimethylphenoxy, 2,3,6-trimethylphenoxy, or 2,4,6-trimethylphenoxy.

In another embodiment of the invention phosphoramides made by the method of the present invention comprise a phosphoramide having a glass transition temperature in one embodiment of at least about 0° C., in another embodiment of at least about 10° C., and in still another embodiment of at least about 20° C., of the formula IX:

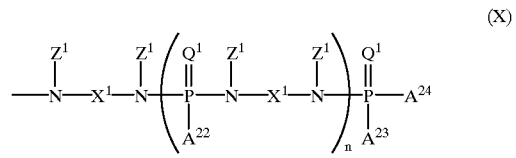

(IX)

wherein each $Q^1$ is independently oxygen or sulfur; each of $A^{18-21}$ is independently an alkyloxy, alkylthio, aryloxy, or arylthio residue, or an aryloxy or arylthio residue optionally containing at least one alkyl or halogen substitution, or mixture thereof; or an amine residue; and each $R^7$ is an alkyl radical, or both $R^7$ radicals taken together are an alkylidene or alkyl-substituted alkylidene radical. In various embodiments each $Q^1$ is oxygen, and each $A^{18-21}$ moiety is independently phenoxy or a substituted phenoxy moiety. In another embodiment each $Q^1$ is oxygen, and each $A^{18-21}$ is an aryloxy moiety with at least one aryloxy moiety having at least one substituent on an aromatic ring ortho to the oxygen linkage. In still other embodiments each $Q^1$ is oxygen, and each $A^{18-21}$ moiety is independently an aryloxy moiety with at least one substituent on each aromatic ring ortho to the oxygen linkage, optionally further substituted. In yet still other embodiments each $Q^1$ is oxygen, and each $A^{18-21}$ moiety is independently an aryloxy moiety with at least two substituents on each aromatic ring ortho to the oxygen linkage, as for example a 2,6-disubstituted phenoxy moiety, optionally further substituted. In various embodiments substituents are $C_{1-8}$ straight-chain or branched alkyl, or halogen. In various embodiments of the invention, each $Q^1$ is oxygen, and each $A^{18-21}$ moiety is independently phenoxy, 2-methylphenoxy, 2,6-dimethylphenoxy, 2,3,6-trimethylphenoxy, or 2,4,6-trimethylphenoxy. In one embodiment, each $Q^1$ is oxygen; both $R^7$ radicals taken together are an unsubstituted $(CH_2)_m$ alkylidene radical, wherein m is 2 to 10; and each $A^{18-21}$ moiety is independently an aryloxy moiety with at least one substituent on each aromatic ring ortho to the oxygen linkage, optionally further substituted, especially 2-methylphenoxy, 2,6-dimethylphenoxy, 2,3,6-trimethylphenoxy, or 2,4,6-trimethylphenoxy. In another embodiment, each $Q^1$ is oxygen; each $R^7$ is methyl; and each $A^{18-21}$ moiety is independently an aryloxy moiety with at least one substituent on each aromatic ring ortho to the oxygen linkage, optionally further substituted, especially 2-methylphenoxy, 2,6-dimethylphenoxy, 2,3,6-trimethylphenoxy, or 2,4,6-trimethylphenoxy.

In another embodiment of the invention, phosphoramides made by the method of the present invention comprise a phosphoramide having a glass transition temperature in one embodiment of at least about 0° C., in another embodiment of at least about 10° C., and in still another embodiment of at least about 20° C., of the formula I:

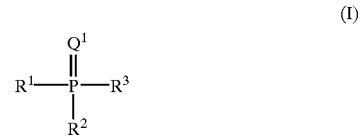

(I)

wherein $Q^1$ is oxygen or sulfur, and $R^1$ is of the formula X:

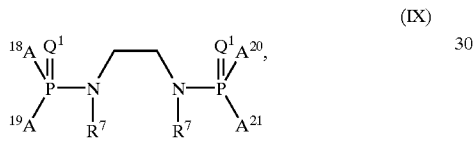

(X)

wherein each $Q^1$ is independently oxygen or sulfur; each of $A^{22-24}$ is independently an alkyloxy, alkylthio, aryloxy, or arylthio residue, or an aryloxy or arylthio residue optionally containing at least one alkyl or halogen substitution, or mixture thereof; or an amine residue; each $Z^1$ is an alkyl radical, aromatic radical, or aromatic radical containing at least one alkyl or halogen substitution or mixture thereof; each $X^1$ is an alkylidene radical, aromatic radical, or aromatic radical containing at least one alkyl or halogen substitution or mixture thereof; n is from 0 to about 200; and $R^2$ and $R^3$ are each independently an alkyloxy, alkylthio, aryloxy, or arylthio residue, or an aryloxy or arylthio residue optionally containing at least one alkyl or halogen substitution, or mixture thereof; or an amine residue. In various embodiments each $Q^1$ is oxygen, and each $A^{22-24}$ moiety and each $R^{2-3}$ moiety is independently phenoxy or a substituted phenoxy moiety. In other embodiments each $Q^1$ is oxygen, and each $A^{22-24}$ moiety and each $R^{2-3}$ moiety is independently an aryloxy moiety with at least one aryloxy moiety having at least one substituent on an aromatic ring ortho to the oxygen linkage, optionally further substituted. In still other embodiments each $Q^1$ is oxygen, and each $A^{22-24}$ moiety and each $R^{2-3}$ moiety is independently an aryloxy moiety with at least one substituent on each aromatic ring ortho to the oxygen linkage, optionally further substituted. In yet still other embodiments each $Q^1$ is oxygen, and each $A^{22-24}$ moiety and each $R^{2-3}$ moiety is independently an aryloxy moiety with at least two substituents on each aromatic ring ortho to the oxygen linkage, as for example a 2,6-disubstituted phenoxy moiety, optionally further substituted. In various embodiments substituents are $C_{1-8}$ straight-chain or branched alkyl, or halogen. In one embodiment, each $Q^1$ is oxygen; each $A^{22-24}$ moiety is independently phenoxy, 2-methylphenoxy, 2,6-dimethylphenoxy, 2,3,6-trimethylphenoxy, or 2,4,6-trimethylphenoxy; each $Z^1$ is methyl or benzyl; each $X^1$ is an alkylidene radical containing 2–24 carbon atoms; n is from 0 to about 5; and $R^2$ and $R^3$ are each independently phenoxy, 2-methylphenoxy, 2,6-dimethylphenoxy, 2,3,6-trimethylphenoxy, or 2,4,6-trimethylphenoxy.

In another embodiment of the invention, phosphoramides made by the method of the present invention comprise a phosphoramide having a glass transition temperature in one embodiment of at least about 0° C., in another embodiment of at least about 10° C., and in still another embodiment of at least about 20° C., of the formula I:

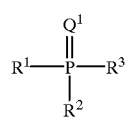

(I)

wherein $Q^1$ is oxygen or sulfur; and $R^1$ is of the formula XI:

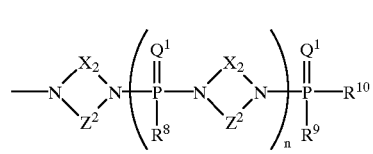

(XI)

wherein each $Q^1$ is independently oxygen or sulfur; each $X^2$ is an alkylidene or alkyl-substituted alkylidene residue, aryl residue, or alkaryl residue; each $Z^2$ is an alkylidene or alkyl-substituted alkylidene residue; each of $R^8$, $R^9$, and $R^{10}$ is independently an alkyloxy, alkylthio, aryloxy, or arylthio residue, or an aryloxy or arylthio residue optionally containing at least one alkyl or halogen substitution, or mixture thereof; or an amine residue; n is from 0 to about 5; and $R^2$ and $R^3$ are each independently an alkyloxy, alkylthio, aryloxy, or arylthio residue, or an aryloxy or arylthio residue optionally containing at least one alkyl or halogen substitution, or mixture thereof; or an amine residue. In various embodiments each $Q^1$ is oxygen, and each $R^{8-10}$ moiety and each $R^{2-3}$ moiety is independently phenoxy or a substituted phenoxy moiety. In other embodiments each $Q^1$ is oxygen, and each $R^{8-10}$ moiety and each $R^{2-3}$ moiety is independently an aryloxy moiety with at least one aryloxy moiety having at least one substituent on an aromatic ring ortho to the oxygen linkage, optionally further substituted. In still other embodiments each $Q^1$ is oxygen, and each $R^{8-10}$ moiety and each $R^{2-3}$ moiety is independently an aryloxy moiety with at least one substituent on each aromatic ring ortho to the oxygen linkage, optionally further substituted. In yet still other embodiments each $Q^1$ is oxygen, and each $R^{8-10}$ moiety and each $R^{2-3}$ moiety is independently an aryloxy moiety with at least two substituents on each aromatic ring ortho to the oxygen linkage, as for example a 2,6-disubstituted phenoxy moiety, optionally further substituted. In various embodiments substituents are $C_{1-8}$ straight-chain or branched alkyl, or halogen. In one embodiment, each $Q^1$ is oxygen; each $X^2$ is an alkylidene or alkyl-substituted alkylidene residue; each $Z^2$ is an alkylidene or alkyl-substituted alkylidene residue; each of $R^2$, $R^3$, $R^8$, $R^9$, and $R^{10}$ is independently phenoxy, 2-methylphenoxy, 2,6-dimethylphenoxy, 2,3,6-trimethylphenoxy, or 2,4,6-trimethylphenoxy; and n is from 0 to about 5. In another embodiment, each $Q^1$ is oxygen; each $X^2$ and $Z^2$ is independently an unsubstituted alkylidene residue of the form $(CH_2)_m$, wherein m is 2 to 10; each of $R^2$, $R^3$, $R^8$, $R^9$, and $R^{10}$ is independently phenoxy, 2-methylphenoxy, 2,6-dimethylphenoxy, 2,3,6-trimethylphenoxy, or 2,4,6-trimethylphenoxy; and n is from 0 to about 5. In other embodiments, the phosphoramide is derived from piperazine (i.e. $X^2$ and $Z^2$ are each —$CH_2$—$CH_2$—).

In another embodiment, phosphoramides made by the method of the present invention comprise a cyclic phosphoramide having a glass transition temperature in one embodiment of at least about 0° C., in another embodiment of at least about 10° C., and in still another embodiment of at least about 20° C. of the formula XII:

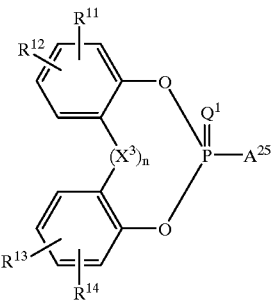

(XII)

wherein each of $R^{11-14}$ is independently a hydrogen, an alkyl radical, or halogen, $X^3$ is an alkylidene radical, $Q^1$ is oxygen or sulfur, and $A^{25}$ is a group derived from a primary or secondary amine having the same or different radicals that can be aliphatic, alicyclic, aromatic, or alkaryl, or $A^{25}$ is a group derived from a heterocyclic amine, or $A^{25}$ is a hydrazine compound. In one embodiment $Q^1$ is oxygen. In other embodiments each $Q^1$ is oxygen, and each of the two phenyl rings is independently at least a monosubstituted phenoxy moiety, wherein the at least one substituent is represented by the linkage to $X^3$. In still other embodiments each $Q^1$ is oxygen, and each of the two phenyl rings is independently at least disubstituted wherein at least one substituent is represented by the linkage to $X^3$. In various embodiments substituents $R^{11-14}$, when present, are straight-chain or branched alkyl, or halogen. In another embodiment $R^{11-14}$ substituents on each aromatic ring are each 2,4-dimethyl or 2,3-dimethyl groups relative to the oxygen linkage. In another embodiment $R^{11}$ and $R^{13}$ are each methyl ortho to the oxygen linkage, and $R^{12}$ and $R^{14}$ are each hydrogen. In a still another embodiment $R^{11-14}$ are hydrogen. It should be noted that when n is 0, then the two aryl rings are linked together at that site (i.e. where $X^3$ is absent) by a single bond in the positions ortho,ortho' to the phosphoryl bonds.

In another embodiment, phosphoramides made by the method of the present invention comprise a bis(cyclic) phosphoramide having a glass transition temperature in one embodiment of at least about 0° C., in another embodiment of at least about 10° C., and in still another embodiment of at least about 20° C. of the formula XIII:

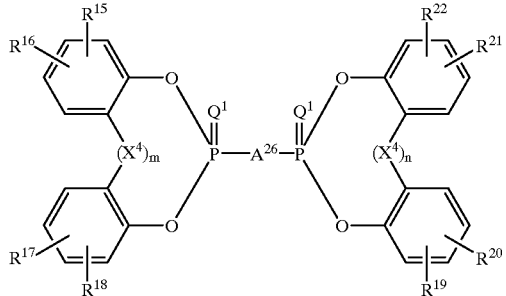

(XIII)

wherein $Q^1$ is oxygen or sulfur; each of $R^{15-22}$ is independently a hydrogen or an alkyl radical, or halogen; $X^4$ is an alkylidene radical; m and n are each independently 0 or 1; and $A^{26}$ is

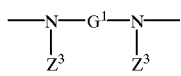

wherein $G^1$ is sulfur, an alkylidene radical, alkyl-substituted alkylidene radical, aryl radical, or alkaryl radical, and each $Z^3$ is independently an alkyl radical, an aryl radical, or an aryl radical containing at least one alkyl or halogen substitution, or mixture thereof; or wherein $A^{26}$ is

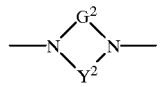

wherein $G^2$ is alkylidene, aryl, or alkaryl, and $Y^2$ is alkylidene or alkyl-substituted alkylidene. In various embodiments each $Q^1$ is oxygen, and each of the four phenyl rings is independently at least a monosubstituted phenoxy moiety, wherein the at least one substituent is represented by the linkage to $X^4$. In still other embodiments each $Q^1$ is oxygen, and each of the two phenyl rings is independently at least disubstituted wherein at least one substituent is represented by the linkage to $X^4$. In various embodiments substituents $R^{15-22}$, when present, are straight-chain or branched alkyl, or halogen. In one embodiment $R^{15-22}$ substituents on each aromatic ring are each 2,4-dimethyl or 2,3-dimethyl groups relative to the oxygen linkage. In another embodiment $R^{15}$, $R^{17}$, $R^{19}$, and $R^{21}$ are each methyl ortho to the oxygen linkage, and $R^{16}$, $R^{18}$, $R^{20}$, and $R^{22}$ are each hydrogen. In a still another embodiment $R^{15-22}$ are hydrogen. In various embodiments phosphoramides include those wherein is oxygen; $A^{26}$ is a residue of piperazine; the phosphoramide has a plane of symmetry through $A^{26}$; $R^{15-22}$ are hydrogen; n and m are each 1; and $X^4$ is $CHR^{23}$ wherein $R^{23}$ is a hydrogen or an alkyl residue of from about 1 to about 6 carbon atoms. It should be noted that when either or both of m or n is 0, then the two aryl rings are linked together at that site (i.e. where $X^4$ is absent) by a single bond in the positions ortho,ortho' to the phosphoryl bonds.

In various embodiments the present invention includes resinous compositions comprising at least one thermoplastic resin and at least one phosphoramide having a glass transition temperature in one embodiment of at least about 0° C., in another embodiment of at least about 10° C., and in still another embodiment of at least about 20° C., the phosphoramide being made by the method of the invention and being substantially free of acidic, basic, or halide impurities, or their precursors. In another embodiment the present invention includes resinous compositions comprising at least one thermoplastic resin and at least one phosphoramide having a glass transition temperature in one embodiment of at least about 0° C., in another embodiment of at least about 10° C., and in still another embodiment of at least about 20° C., the phosphoramide being made by the method of the invention and comprising in one embodiment less than about 2 wt. % of pyrophosphate, in another embodiment less than about 1 wt. % of pyrophosphate, in another embodiment less than about 0.5 wt. % of pyrophosphate, in still another embodiment less than about 0.2 wt. % of pyrophosphate, and in still another embodiment less than about 0.1 wt. % of pyrophosphate based on the weight of phosphoramide.

The major constituent of resinous compositions of the invention is at least one thermoplastic polymer. Thermoplastic polymers include both addition and condensation polymers. Illustrative, non-limiting examples of thermoplastic polymers include olefin polymers such as polyethylene and polypropylene; diene polymers such as polybutadiene and polyisoprene; polymers of ethylenically unsaturated carboxylic acids and their functional derivatives, including acrylic polymers such as poly(alkyl acrylates), poly(alkyl methacrylates), polyacrylamides, polyacrylonitrile and polyacrylic acid; alkenylaromatic polymers such as polystyrene, poly-alpha-methylstyrene, polyvinyltoluene, rubber-modified polystyrenes, and the like; polyamides such as nylon-6 and nylon-66; polyesters; polycarbonates; and polyarylene ethers.

Both thermoplastic and thermoplastic elastomeric polyesters are suitable for use in the present invention. Illustrative, non-limiting examples of thermoplastic polyesters include poly(ethylene terephthalate), poly(1,4-butylene terephthalate), poly(1,3-propylene terephthalate), polycyclohexanedimethanol terephthalate, polycyclohexanedimethanol-co-ethylene terephthalate, polyethylene naphthalate, polybutylene naphthalate, and polyarylates. Illustrative, non-limiting examples of thermoplastic elastomeric polyesters (commonly known as TPE) include polyetheresters such as poly(alkylene terephthalate)s (particularly poly[ethylene terephthalate] and poly[butylene terephthalate]) containing soft-block segments of poly(alkylene oxide), particularly segments of poly(ethylene oxide) and poly(butylene oxide); and polyesteramides such as those synthesized by the condensation of an aromatic diisocyanate with dicarboxylic acids and a carboxylic acid-terminated polyester or polyether prepolymer.

Suitable polyarylates include, but are not limited to, the polyphthalate esters of 2,2-bis(4-hydroxyphenyl)propane (commonly known as bisphenol A), and polyesters consisting of structural units of the formula II:

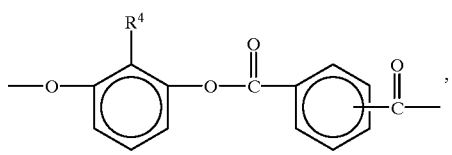

(II)

wherein R⁴ is hydrogen or $C_{1-4}$ alkyl, optionally in combination with structural units of the formula III:

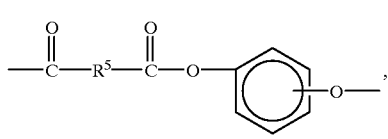

(III)

wherein R⁵ is a divalent $C_{4-12}$ aliphatic, alicyclic or mixed aliphatic-alicyclic radical. The latter polyesters are prepared by the reaction of a 1,3-dihydroxy-benzene with at least one aromatic dicarboxylic acid chloride under alkaline conditions. Structural units of formula II contain a 1,3-dihydroxybenzene moiety which may be substituted with halogen, usually chlorine or bromine, or with $C_{1-4}$ alkyl; e.g., methyl, ethyl, isopropyl, propyl, butyl. Said alkyl groups are in various embodiments primary or secondary groups, with methyl being present in one embodiment, and are most often located in the ortho position to both oxygen atoms although other positions are also contemplated. In various embodiments the moieties are resorcinol moieties, in which R⁴ is hydrogen. Said 1,3-dihydroxybenzene moieties are linked to aromatic dicarboxylic acid moieties which may be monocyclic moieties, e.g., isophthalate or terephthalate, or polycyclic moieties, e.g., naphthalenedicarboxylate. In various embodiments, the aromatic dicarboxylic acid moieties are isophthalate and/or terephthalate: either or both of said moieties may be present. For the most part, both are present in a molar ratio of isophthalate to terephthalate in a range in one embodiment of about 0.25–4.0:1, in another embodiment of about 0.8–2.5:1.

In the optional soft block units of formula II, resorcinol or alkylresorcinol moieties are again present in ester-forming combination with R⁵ which is a divalent $C_{4-12}$ aliphatic, alicyclic or mixed aliphatic-alicyclic radical. It is in one embodiment aliphatic and especially $C_{8-12}$ straight chain aliphatic. In one embodiment an arylate polymer containing soft block units is one consisting of resorcinol isophthalate and resorcinol sebacate units in a molar ratio between about 8.5:1.5 and about 9.5:0.5.

Polycarbonates useful in the compositions of the invention include those comprising structural units of the formula IV:

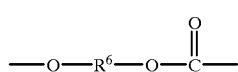

(IV)

wherein at least about 60 percent of the total number of R⁶ groups are aromatic organic radicals and the balance thereof are aliphatic, alicyclic, or aromatic radicals. In one embodiment, R⁶ is an aromatic organic radical and in another embodiment a radical of the formula V:

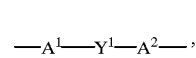

(V)

wherein each A¹ and A² is a monocyclic divalent aryl radical and Y¹ is a bridging radical in which one or two atoms, separate A¹ from A². In one embodiment one atom separates A¹ from A². Illustrative non-limiting examples of radicals of this type are —O—, —S—, —S(O)— or —S(O₂)—, —C(O)—, methylene, cyclohexyl-methylene, 2-[2.2.1]-bicycloheptylidene, ethylidene, isopropylidene, neopentylidene, cyclohexylidene, 3,3,5-trimethylcyclohexylidene, cyclopentadecylidene, cyclododecylidene, and adamantylidene. The bridging radical Y¹ is most often a hydrocarbon group and particularly a saturated group such as methylene, cyclohexylidene, 3,3,5-trimethylcyclohexylidene, or isopropylidene.

In various embodiments polycarbonates are derived from dihydric phenols in which only one atom separates A¹ and A². Some illustrative, non-limiting examples of dihydric phenols include the dihydroxy-substituted aromatic hydrocarbons disclosed by name or formula (generic or specific) in U.S. Pat. No. 4,217,438, which is incorporated herein by reference. Some illustrative examples of dihydric phenols include 4,4'-dihydroxybiphenyl; 4,4'-(3,3,5-trimethylcyclohexylidene)diphenol; 2,2-bis(4-hydroxyphenyl)propane (commonly known as bisphenol A); 2,2-bis(4-hydroxy-3,5-dimethylphenyl)propane; 2,4'-dihyroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl)cyclohexylmethane; 2,2-bis(4-hydroxyphenyl)-1-phenylpropane; resorcinol; $C_{1-3}$ alkyl-substituted resorcinols, and 6,6'-dihydroxy-3,3,3',3'-tetramethyl-1,1'-spirobiindane.

In various embodiments polycarbonates are bisphenol A polycarbonates, in which each of A¹ and A² is p-phenylene and Y¹ is isopropylidene. The weight average molecular weight of the initial polycarbonate is in one embodiment in a range of between about 5,000 and about 100,000; in another embodiment in a range of between about 10,000 and about 65,000, in still another embodiment in a range of between about 16,000 and about 40,000, and in still another embodiment in a range of between about 20,000 and about 36,000. Suitable polycarbonates may be made using any process known in the art, including interfacial, solution, solid state, or melt processes.

In one embodiment the present invention comprises a composition containing at least one polycarbonate. In another embodiment the invention comprises compositions containing two different polycarbonates. Both homopolycarbonates derived from a single dihydroxy compound monomer and copolycarbonates derived from more than one dihydroxy compound monomer are encompassed. In one embodiment compositions comprise a bisphenol A homopolycarbonate and a copolycarbonate comprising bisphenol A monomer units and 4,4'-(3,3,5-trimethylcyclohexylidene)diphenol monomer units. The copolycarbonate comprises in one embodiment 5–65 mole %, in another embodiment 15–60 mole %, and in still another embodiment 30–55 mole % of 4,4'(3,3,5-trimethylcyclohexylidene)diphenol with the remaining dihydroxy monomer being bisphenol A. The weight ratio of bisphenol A polycarbonate to the aforementioned copolycarbonate in compositions of the present invention is in one embodiment in a range of between about 95:5 and about 70:30 and in another embodiment in a range of between about 85:15 and about 75:25.

Also suitable for use in the present invention are polyestercarbonates. The polyestercarbonates may generally be termed copolyesters containing carbonate groups, carboxylate groups, and aromatic carbocyclic groups in the polymer chain, in which at least some of the carboxylate groups and at least some of the carbonate groups are bonded directly to ring carbon atoms of the aromatic carbocyclic groups. These polyestercarbonates are, in general, prepared by reacting at least one dihydric phenol, at least one difunctional carboxylic acid or reactive derivative of an acid such as an acid dihalide, and a carbonate precursor. Suitable dihydric phenols include, but are not limited to, those named or referred to hereinabove. Some illustrative, non-limiting examples of suitable aromatic dicarboxylic acids include phthalic acid, isophthalic acid, terephthalic acid, homophthalic acid, o-, m-, and p-phenylenediacetic acid; and the polynuclear aromatic acids such as diphenic acid, 1,4-naphthalene dicarboxylic acid, 2,6-naphthalene dicarboxylic acid, and the like. These acids may be used either individually, or as a mixture of two or more different acids in the preparation of suitable polyestercarbonates. In one embodiment polyestercarbonates are block polyestercarbonates comprising structural units derived from resorcinol or an alkyl-substituted resorcinol, a mixture of isophthalic and terephthalic acids, bisphenol A, and a carbonate precursor such as phosgene or diphenyl carbonate.

The polyestercarbonates which find use in the instant invention and the methods for their preparation are well known in the art as disclosed in, for example, U.S. Pat. Nos. 3,030,331; 3,169,121; 3,207,814; 4,194,038; 4,156,069; 4,238,596; 4,238,597; 4,487,896; 4,506,065, and in copending application Ser. No. 09/181,902, filed Oct. 29, 1998, and assigned to the same assignee as the instant application, all of which are hereby incorporated by reference. Among the properties characterizing these polymers is a relatively high distortion temperature under load (DTUL) as well as a relatively high impact strength as measured by a notched Izod test protocol.

The polyarylene ethers are most often polyphenylene ethers having structural units of the formula:

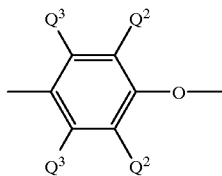

wherein each $Q^2$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms, and each $Q^3$ is independently hydrogen, halogen, primary or secondary lower alkyl, phenyl, haloalkyl, hydrocarbonoxy or halohydrocarbonoxy as defined for $Q^2$.

Both homopolymer and copolymer polyphenylene ethers are included. In various embodiments homopolymers are those containing 2,6-dimethyl-1,4-phenylene ether units. Suitable copolymers include random copolymers containing such units in combination with, for example, 2,3,6-trimethyl-1,4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals undergo reaction in known manner with the hydroxy groups of two polyphenylene ether chains to produce a higher molecular weight polymer.

The polyphenylene ethers generally have an intrinsic viscosity (IV) greater than about 0.1, most often in the range of about 0.2–0.6 and especially about 0.30–0.60 deciliters per gram (dl./g.), as measured in chloroform at 25° C.

The polyphenylene ethers are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful polyphenylene ethers for many purposes are those which comprise molecules having at least one aminoalkyl-containing end group. The aminoalkyl radical is covalently bound to a carbon atom located in an ortho position to a hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups and/or biphenyl structural units, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxy-biphenyl end groups. It will be apparent to those skilled in the art from the foregoing that the polyphenylene ethers contemplated for use in the invention include all those presently known, irrespective of variations in structural units or ancillary chemical features.

Both homopolymer and copolymer thermoplastic polymers are included in the compositions of the present invention. Copolymers may include random, block or graft type. Thus, for example, suitable polystyrenes include homopolymers, such as amorphous polystyrene and syndiotactic polystyrene, and copolymers. The latter embraces high impact polystyrene (HIPS), a genus of rubber-modified polystyrenes comprising blends and grafts wherein the rubber is a polybutadiene or a rubbery copolymer of about 70–98% styrene and 2–30% diene monomer. Also included are ABS copolymers, which are typically grafts of styrene and acrylonitrile on a previously formed diene polymer backbone (e.g., polybutadiene or polyisoprene). Suitable ABS copolymers may be produced by any methods known in the art. In various embodiments ABS copolymers are produced by mass polymerization (often referred to as bulk ABS) or emulsion polymerization (often referred to as high rubber graft ABS).

Thermoplastic polymers in many embodiments are polyesters, polycarbonates, polyphenylene ethers, polystyrene resin, high impact polystyrene resin (HIPS), and styrene-acrylonitrile copolymers (SAN), including ABS copolymers. These may be employed individually or as blends. In various embodiments blends include those of polyphenylene ether with at least one of HIPS, amorphous polystyrene, and syndiotactic polystyrene; and polycarbonate blends with at least one of ABS, SAN, and polyester.

In resinous compositions there is often an improvement in melt flow and/or other physical properties when one molecular weight grade of at least one resinous constituent is combined with a relatively lower molecular weight grade of similar resinous constituent. Illustrative, non-limiting examples include compositions containing polycarbonate, polyphenylene ether, thermoplastic polyester, thermoplastic elastomeric polyester, or polyamide. For example, in a polycarbonate-containing blend there is often an improvement in melt flow when one molecular weight grade of polycarbonate is combined with a proportion of a relatively lower molecular weight grade of similar polycarbonate. Therefore, the present invention encompasses compositions comprising only one molecular weight grade of a particular resinous constituent and also compositions comprising two or more molecular weight grades of similar resinous constituent. When two or more molecular weight grades of similar resinous constituent are present, then the weight average molecular weight of the lowest molecular weight constituent is in one embodiment in a range of between about 10% and about 95%, in another embodiment in a range of between about 40% and about 85%, and in still another embodiment in a range of between about 60% and about 80% of the weight average molecular weight of the highest molecular weight constituent. In one representative, non-limiting embodiment polycarbonate-containing blends include those comprising a polycarbonate with weight average molecular weight between about 28,000 and about 32,000 combined with a polycarbonate with weight average molecular weight between about 16,000 and about 26,000. When two or more molecular weight grades of similar resinous constituent are present, the weight ratios of the various molecular weight grades may range from about 1 to about 99 parts of one molecular weight grade and from about 99 to about 1 parts of any other molecular weight grades. In various embodiments a mixture of two molecular weight grades of a resinous constituent is employed, in which case the weight ratios of the two grades may be in one embodiment in a range of between about 99:1 and about 1:99, in another embodiment in a range of between from about 80:20 and about 20:80, and in still another embodiment in a range of between from about 70:30 and about 50:50. Since not all manufacturing processes for making a particular resinous constituent are capable of making all molecular weight grades of that constituent, the present invention encompasses compositions comprising two or more molecular weight grades of similar resinous constituent in which each of the similar resins is made by a different manufacturing process. In one particular embodiment the instant invention encompasses compositions comprising a polycarbonate made by an interfacial process in combination with a polycarbonate of different weight average molecular weight made by a melt process.

The compositions of the invention may contain essentially a single phosphoramide or a mixture of two or more different phosphoramides. When at least one phosphoramide having a glass transition temperature of at least about 0° C. is used as a source of phosphorus in resin compositions, it was unexpectedly found that a higher heat deflection temperature of test specimens made from the resin composition could be obtained as compared to compositions containing an organophosphate known in the art for enhancing the processability and/or flame resistance characteristics of the composition.

Although the invention is not dependent upon mechanism, it is believed that selection of each of $R^1$, $R^2$, and $R^3$ residues that result in restricted rotation of the bonds connected to the phosphorus provide an increased glass transition temperature in comparison to similar phosphoramides with residues having a lesser degree of restriction. Residues having bulky substituents such as, for example, aryloxy residues containing at least one halogen, or at least one alkyl substitution, result in phosphoramides having a higher glass transition temperature than similar phosphoramides without the substitution on the aryloxy residue. Likewise, residues wherein at least two of the $R^1$, $R^2$, and $R^3$ residues are interconnected, such as a neopentyl residue for the combination of the $R^2$ and $R^3$ residues, can lead to desired phosphoramides having a glass transition temperature of at least about 0° C.

It should be noted that in the descriptions herein, the words "radical" and "residue" are used interchangeably, and are both intended to designate an organic moiety. For example, alkyl radical and alkyl residue are both intended to designate an alkyl moiety. The term "alkyl" as used in the various embodiments of the present invention is intended to designate both normal alkyl, branched alkyl, aralkyl, and cycloalkyl radicals. Normal and branched alkyl radicals include those containing from 1 to about 12 carbon atoms, and include as illustrative non-limiting examples methyl, ethyl, propyl, isopropyl, butyl, tertiary-butyl, pentyl, neopentyl, and hexyl. Cycloalkyl radicals represented include those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. Aralkyl radicals include those containing from 7 to about 14 carbon atoms; these include, but are not limited to, benzyl, phenylbutyl, phenylpropyl, and phenylethyl. Aryl radicals used in the various embodiments of the present invention include those containing from 6 to 12 ring carbon atoms. Some illustrative non-limiting examples of these aryl radicals include phenyl, biphenyl, and naphthyl. Halogen radicals used in the various embodiments of the present invention include chlorine and bromine.

In one embodiment resinous compositions of the invention contain a flame retarding and/or processability enhancing amount of at least one phosphoramide, or a mixture of (c) at least one phosphoramide and (d) at least one non-polymeric or polymeric phosphorus additive selected from the group consisting of organic phosphate esters, thiophosphate esters, phosphonate esters, thiophosphonate esters, phosphinate esters, thiophosphinate esters, phosphine oxides, and thiophosphine oxides. For convenience, compounds selected from group (d) are hereinafter referred to as "phosphorus additives". In various embodiments phosphorus additives are non-polymeric organic phosphate esters including, for example, alkyl phosphate esters, aryl phosphate esters, resorcinol-based phosphate esters, and bisphenol-based phosphate esters known in the art, including resorcinol bis(diphenyl phosphate) and bisphenol A bis(diphenyl phosphate).

The amount of at least one phosphoramide or mixture of at least one phosphoramide and at least one phosphorus additive in the compositions of the invention is in one embodiment in a range of about 0.1–5 parts, in another embodiment in a range of about 0.25–2.5 parts, of phosphorus per 100 parts of resinous materials (phr), all percentages herein being by weight. The total amount of phosphoramide and adjunct flame retardant is in one embodiment in a range of about 0.1–50 phr, in another embodiment in a range of about 0.5–35 phr, and in still another embodiment in a range of about 1–25 phr. The total amount of phosphorus present in the compositions of the invention is in one embodiment in a range between about 0.008 parts and about 3 parts per 100 parts of resinous materials and in another embodiment in a range of between about 0.1 parts and about 3 parts per 100 parts of resinous materials.

Flame retardancy may be measured according to the Underwriters' Laboratory UL-94 protocol. A flame retarding amount is an amount effective to render the composition in one embodiment at least a V-2 rating, in another embodiment at least a V-1 rating, and in still another embodiment a V-0 rating after testing in the UL-94 protocol when measured on a test specimen in one embodiment of about 0.03 to about 0.125 inch in thickness by about 0.5 inch by about 5 inch, in another embodiment about 0.125 inch in thickness by about 0.5 inch by about 5 inch, in still another embodiment about 0.06 inch in thickness by about 0.5 inch by about 5 inch, and in still another embodiment about 0.03 inch in thickness by about 0.5 inch by about 5 inch dimensions. Enhanced processability can be determined, for example, as a reduction in extruder torque during compounding, reduced pressure in injection molding, reduced viscosity, and/or decreased cycle time.

In one embodiment of the present invention halogen-containing flame retardants or other halogen-containing species may also be present in the compositions. In many resinous compositions, the combination of a halogen-containing flame retardant and at least one phosphoramide (or mixture of phosphoramide with at least one phosphorus additive), particularly including a phosphoramide having a glass transition temperature of at least about 0° C., provides both suitable flame retardant properties and unexpectedly improved high temperature properties (such as measured, for example, by HDT or Tg of a resinous phase). Illustrative, non-limiting examples of halogen-containing flame retardants or halogen-containing species include brominated flame retardants, such as brominated polycarbonate, and phosphoramides containing halogenated aromatic substituents. Due to environmental regulations chlorine-free and bromine-free compositions may be preferred for certain applications. Therefore, in another embodiment the present invention includes compositions comprising a thermoplastic resin and at least one phosphoramide having a glass transition temperature of at least about 0° C., said compositions being essentially free of chlorine and bromine. In this context essentially free means that no chlorine- or bromine-containing species has been added to the resinous compositions in their formulation. In another of its embodiments the present invention includes articles obtained from said chlorine-free or bromine-free compositions.

The compositions of the invention may also contain other conventional additives including antistatic agents, stabilizers such as heat stabilizers and light stabilizers, inhibitors, plasticizers, flow promoters, fillers, mold release agents, impact modifiers, and anti-drip agents. The latter are illustrated by tetrafluoroethylene polymers or copolymers, including mixtures with such other polymers as polystyrene-co-acrylonitrile (sometimes referred to herein as styrene-acrylonitrile copolymer). Representative examples of fillers include glass fibers, carbon fibers, carbon nanotubes, carbon black, mica, clay, nanoclay, barium sulfate, antimony oxide, titanium dioxide, wollastonite, silica, and talc. Representative examples of mold release agents include pentaerythritol tetrastearate, octyl behenate, and polyethylene. Representative examples of impact modifiers include polybutene and core-shell materials such as poly(methyl methacrylate)-co-poly(butyl acrylate)-co-poly(dimethylsiloxane). In certain embodiments of the invention additives include low molecular weight hydrocarbons with molecular weight between about 500 and 1000 such as ARKON available from Arakawa Chemical USA, and terpenephenols.

In one embodiment a characteristic of compositions of the invention is their improved high temperature properties. These are demonstrated by the fact that the decrease in glass transition temperature (Tg) exhibited as a result of the incorporation of a phosphoramide in the composition is substantially less than the corresponding decrease exhibited in blends containing, for example, phosphate esters such as bis(diaryl phosphates) of dihydroxyaromatic compounds. This is evident when a phosphoramide is compared to the organic phosphate ester in amounts suitable to provide enhanced flame resistance when measured, for example, in the UL-94 test procedure. In the case of phase-separated blends such as polycarbonate-ABS blends, the decrease in Tg is noted in the polycarbonate phase.

Experience has shown that the flame retarding properties of a phosphoryl-based compound included in a resinous composition are generally proportional to the amount of phosphorus in the composition rather than to the amount of the compound itself. Thus, equal weights of two additives having different molecular weights but the same flame retarding properties may produce different UL-94 results, but amounts of the two additives which contribute the same proportion of phosphorus to the resinous composition will produce the same UL-94 results. On the other hand, other physical properties such as high temperature resistance are dependent on the amount of the compound itself and relatively independent of the phosphorus proportion therein. For this reason, the dependence of flame retarding and high temperature resistance of compositions containing two phosphorus-based compounds may not follow the same pattern.

It has been shown, however, with respect to phosphoramides employed according to the present invention that their superior properties of flame retardance and high temperature resistance are consistent. Thus, for example, proportions of the prior art additive resorcinol bis(di-2,6-xylyl phosphate) effective to confer a suitable flame-out time on certain resinous compositions are similar to those proportions of a typical bis(2,6-xylyl)-phosphoramide at an essentially equivalent level of phosphorus, but the bisphosphoramide has a substantially lower tendency to decrease heat deflection temperature (HDT) despite the slightly greater amount of the bulk additive.

It should be clear that the present invention also affords methods to increase the heat distortion temperature of flame resistant compositions containing an amount of a phosphorus-containing compound effective to render the composition a flame rating of in one embodiment at least V-2, in another embodiment of at least V-1, and in still another embodiment V-0, in the UL-94 protocol, wherein the method comprises combining at least one thermoplastic resin and at least one phosphoramide having a glass transition temperature of in one embodiment at least about 0° C., in another embodiment of at least about 10° C., and in still another embodiment of at least about 20° C., said phosphoramide being substantially free of acidic, basic, or halide impurities, or their precursors. In one embodiment the invention also affords methods to increase the heat distortion temperature of chlorine-free and bromine-free, flame resistant compositions as described in the previous sentence. The method may be used to increase the heat distortion temperature of compositions containing essentially a single phosphoramide, or a mixture of two or more different phosphoramides. Compositions containing essentially a single phosphoramide may be employed. Useful thermoplastic resins have been described herein. In various embodiments thermoplastic resins are polycarbonate, most especially bisphenol A-based polycarbonate, and blends of polycarbonate, especially polycarbonate-SAN-ABS blends and polycarbonate-ABS blends, in which the amount of ABS may typically vary from about 1 to about 45 wt. %. In one embodiment the phosphoramide is N,N'-bis-[di-(2,6-xylyl)-phosphoryl]piperazine. The method may further comprise at least one phosphorus additive selected from the group consisting of organic phosphate esters, thiophosphate esters, phosphonate esters, thiophosphonate esters, phosphinate esters, thiophosphinate esters, phosphine oxides, and thiophosphine oxides. In various embodiments the phosphorus additive is a non-polymeric organic phosphate ester. It should also be clear that the present invention includes compositions made by the methods as well as articles made from the compositions.

Preparation methods for the compositions of the invention are typical of those employed for resinous blends. They may include such steps as dry blending followed by melt processing, the latter operation frequently being performed under continuous conditions as by extrusion. Following melt processing, the compositions are molded into test specimens by conventional means such as injection molding.

The addition of at least one phosphoramide or mixture of at least one phosphoramide and at least one phosphorus additive to the compositions of the present invention may be by mixing all of the blend components together prior to melt processing. Alternatively, any or a combination of any of the phosphorus-containing species, particularly a phosphoramide or a phosphorus additive, may be combined with at least one resinous blend component as a concentrate in a prior processing step. Such concentrates are often made by melt processing. The concentrate may then be combined with the remaining blend components. In one embodiment a concentrate comprises a bisphenol A polycarbonate as resinous component. Illustrative amounts of phosphoramide in a polycarbonate concentrate are in one embodiment in a range of from about 8% to about 40%, and in another embodiment in a range of from about 10% to about 30% by weight.

The various embodiments of the invention are inclusive of simple blends comprising at least one thermoplastic resin and at least one phosphoramide, and also of compositions in which one or more of said materials has undergone chemical reaction, either by itself or in combination with another blend component. Thus, in one embodiment compositions of the invention comprise at least one thermoplastic resin and at least one phosphoramide substantially free of acidic, basic, or halide impurities and their precursors, and any reaction products of said thermoplastic resin or resins and said phosphoramide or phosphoramides. When proportions are specified, they apply to the originally incorporated materials rather than those remaining after any such reaction.

In another of its embodiments the present invention comprises articles of manufacture made from the instantly disclosed compositions. Such articles may be transparent, translucent, or opaque depending upon the blend composition. Said articles can be made by any convenient means known in the art. Typical means include, but are not limited to, injection molding, thermoforming, blow molding, and calendering. In various embodiments articles include indirect and direct wound deflection yokes for all cathode ray tube applications including television and computer monitors, slit type deflection yokes, mold coil deflection yokes, television backplates, docking stations, pedestals, bezels, pallets, electronic equipment such as switches, switch housings, plugs, plug housings, electrical connectors, connecting devices, sockets; housings for electronic equipment such as television cabinets, computer housings, including desk-top computers, portable computers, lap-top computers, palm-held computers; monitor housings, printer housings, keyboards, FAX machine housings, copier housings, telephone housings, mobile phone housings, radio sender and/or receiver housings, lights and lighting fixtures, battery chargers, battery housings, antenna housings, transformers, modems, cartridges, network interface devices, circuit breakers, meter housings, panels for wet and dry appliances such as dishwashers, clothes washers, clothes dryers, refrigerators; heating and ventilation enclosures, fans, air conditioner housings, cladding and seating for indoor and outdoor application such as public transportation including trains, subways, buses; automotive electrical components; articles used in glazing applications, such as roofs, greenhouses, sunrooms, swimming pool enclosures, windows.

The invention is illustrated by the following examples. All parts and percentages are by weight. Intrinsic viscosity was determined in chloroform at 25° C. HDT values were determined at 264 psi (1820 kPa) according to ASTM procedure D648.

EXAMPLE 1

Blends of various amounts of a bisphenol A homopolycarbonate, 6.5 parts of a commercially available high rubber graft ABS copolymer and 9 parts of a commercially available SAN copolymer were prepared under identical conditions by blending in a Henschel mixer followed by extrusion on a twin screw extruder and were molded into test specimens. The blends also contained conventional additives including 0.4 part of polytetrafluoroethylene dispersed within styrene-acrylonitrile copolymer as an anti-drip agent, which were not considered in determining proportions, and various amounts of the following phosphoryl-based flame retardant additives: N,N'-bis-[di-(2,6-xylyl)phosphoryl]piperazine (XPP), a compound according to formula VI:

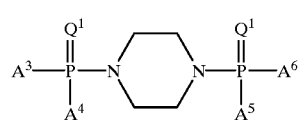

(VI)

wherein each A moiety is a 2,6-dimethylphenoxy residue; N,N'-bis(neopentylenedioxy phosphoryl)piperazine (NPP), a compound of similar structure but wherein each pair of A moieties on each phosphorus atom (e.g. the $A^3$ and $A^4$ pair) is a bridging neopentyloxy residue; N,N'-bis(diphenyl phosphoryl)piperazine (PPP), a compound of similar structure but wherein each A moiety is a phenoxy residue; and resorcinol bis (diphenyl phosphate) (RDP) and bisphenol A bis (diphenyl phosphate) (BPADP), two conventional phosphate esters. The FOT (total flameout times for first and second ignitions for 5 bars of 0.125 inch thickness) and Tg of the polycarbonate phase of each test specimen was determined and the results are given in Table I.

TABLE I

| Sample | Base | 1 | 2 | 3 | 4 | 5 |
|---|---|---|---|---|---|---|
| Polycarbonate, parts | 81.3 | 72.2 | 76.9 | 73.9 | 73.6 | 71.6 |
| FR, identity | none | XPP | NPP | PPP | RDP | BPADP |
| FR, phr | 0 | 12.4 | 6.9 | 10.4 | 10.7 | 13.2 |
| FR, phr P | 0 | 1.16 | 1.11 | | 0.97 | 1.02 |
| FR, % P | 0 | 1.02 | 1.01 | 1.04 | 1.03 | 1.04 |
| FOT, sec | burns | 19.4 | 84 | — | 20.3 | 27.3 |
| Tg, ° C. | 147 | 131 | 149 | 121 | 111 | 112 |

It is apparent that the compositions of this invention had an significantly reduced FOT and a Tg that differed from that of polycarbonate (147° C.) in a base composition not containing a phosphoramide or phosphate ester by an acceptable increment. Sample 2 had a Tg essentially equal within experimental error to that of the polycarbonate in the base composition but the FOT was appreciably higher than that obtained with XPP. Sample 3 utilizing PPP had a significantly lower Tg that that of XPP and NPP. It was unexpected that XPP-containing compositions (e.g., sample 1) would exhibit such superior FOT as compared to NPP-containing compositions (e.g., sample 2), and such a large increase in polycarbonate Tg as compared to PPP-containing compositions (e.g., sample 3). Samples 4 and 5, employing conventional flame retardants (FR), had unacceptably low Tg's for many commercial applications. The variations in FR content in terms of phr of total FR and of phosphorus are not considered significant from the standpoint of properties.

EXAMPLE 2

In the same base composition used for Example 1, a composition was made containing 4.5 parts RDP and 5.7 XPP. The resultant composition has a flame out time of 17 seconds and the polycarbonate had a Tg of 127° C. The glass transition temperature is higher for this composition that would be expected based upon the results obtained in samples 1 and 4.

EXAMPLE 3

Blends of 62 parts of a commercially available poly(2,6-dimethyl-1,4-phenylene ether) and 38 parts of a commercially available HIPS were prepared and molded under identical conditions similar to those of Example 1. The blends also contained conventional additives including 0.21 part of a polytetrafluoroethylene/styrene-acrylonitrile copolymer as an anti-drip agent, which were not considered in determining proportions, and 20.5 phr of XPP, RDP and BPADP as phosphoryl-based flame retardant additives. The FOT (total flameout times for first and second ignitions for 5 bars of 0.06 inch thickness) and heat deflection temperature (HDT) of each test specimen was determined and the results are given in Table II.

TABLE II

| Sample | 6 | 7 | 8 |
|---|---|---|---|
| FR, identity | XPP | RDP | BPADP |
| FR, phr P | 1.92 | 1.85 | 1.58 |
| FOT, sec | 24 | 21 | 37 |
| HDT, ° C. | 223.9 | 177.9 | 190.5 |

Again, it is apparent that the composition of the invention (Sample 6) had acceptable FR properties and a significantly higher HDT than the compositions containing conventional FR additives, indicating superior high temperature properties.

EXAMPLE 4

A blend of 40 parts of a commercially available poly(2,6-dimethyl-1,4-phenylene ether) and 60 parts of a commercially available HIPS were prepared and molded under conditions similar to those of Example 3, using N,N'-bis[di-(2,6-xylyl)phosphoryl]piperazine (XPP) as the flame retardant material in essentially the same proportion. The observed FOT was 34 seconds.

EXAMPLE 5

A commercially available HIPS, optionally containing poly(2,6-dimethyl-1,4-phenylene ether) and/or a polystyrene-polybutadiene-polystyrene elastomer, were prepared and molded under conditions similar to those of Example 1, using N,N'-bis[di-(2,6-xylyl)phosphoryl] piperazine (XPP) as the flame retardant material. The compositions and flame out times (FOT, as defined above for Table 1) are provided in Table III.

TABLE III

| Sample | Base | 9 | 10 | 11 | 12 | 13 |
|---|---|---|---|---|---|---|
| HIPS, parts | 100 | 90 | 70 | 65 | 72 | 78.5 |
| PPE, parts | 0 | 0 | 0 | 25 | 7 | 3.5 |
| Rubber, parts | 0 | 0 | 0 | 0 | 2 | 3.5 |
| XPP, parts | 0 | 10 | 30 | 10 | 19 | 14 |
| FOT, sec | burns | 320 | 135 | 400 | 215 | 315 |
| HDT, ° C., 264 psi | 86 | 74 | 68 | 79 | 71 | 73 |

As seen by the above data, phosphoramides as described herein are effective in reducing the flame out time of HIPS, optionally in the presence of PPE and/or rubber. It was unexpected that the flame out times would be so dramatically improved, i.e. decreased, with the addition of the phosphoramide to render the material V-2 under UL-94 classification. It was also unexpected that the HDT would be so high for the compositions containing the phosphoramide.

EXAMPLE 6

Blends of 90 parts of a commercially available bisphenol A polycarbonate were prepared containing 10 parts of either RDP or XPP. The blends also contained conventional additives, including a UV screener and an antioxidant, which were not considered in determining proportions. The compositions were extruded and molded into transparent specimens. Optical properties (according to ASTM 1003-61), including % transmission, yellowness index, and haze, and the Tg of the polycarbonate phase were determined for test specimens of each blend. The results are given in Table IV along with results for a comparable composition containing essentially 100% of the same polycarbonate and no added flame retardant.

TABLE IV

| Sample | Base | 14 | 15 |
|---|---|---|---|
| Polycarbonate | 100 | 90 | 90 |
| RDP | 0 | 10 | 0 |
| XPP | 0 | 0 | 10 |
| Tg, ° C. | 149 | 111 | 131 |
| Transmission, % | 90.1 | 88.3 | 89.5 |
| Haze | 0.7 | 3.3 | 0.7 |
| Yellowness index | 2.24 | 3.18 | 4.16 |

The above data show that the composition containing XPP has the same % transmission and haze as a specimen of essentially pure polycarbonate, and an acceptable yellowness index. Compared to the base sample, the decrease in polycarbonate Tg is only 18° C. for the specimen containing XPP compared to 38° C. for the specimen containing RDP.

EXAMPLE 7

A blend of 26.5 parts of a first bisphenol A homopolycarbonate, 61.8 parts of a second bisphenol A homopolycarbonate with weight average molecular weight about 71% of that of the first bisphenol A homopolycarbonate, 4 parts of a commercially available bulk ABS copolymer, and 5 parts XPP was prepared by blending in a Henschel mixer followed by extrusion on a twin screw extruder and molded into test specimens. The blend also contained 2.75 parts conventional additives including titanium dioxide and polytetrafluoroethylene dispersed within styrene-acrylonitrile copolymer as an anti-drip agent. Measurement of the Melt Volume Rate (260° C. and 5 kilograms applied weight) for the blend gave a value of 24.9 cubic centimeters per 10 minutes. The blend showed a melt viscosity at 280° C. of 390 Pascal-seconds (Pa-s) at a shear rate of 100 sec$^{-1}$, 220 Pa-s at a shear rate of 1500 sec$^{1}$, and 72 Pa-s at a shear rate of 10000 sec$^{-1}$. The observed FOT (total flameout times for first and second ignitions for 5 bars of 0.06 inch thickness) was 21.5 seconds. A Ball Pressure Test run on test specimens at 125° C. according to test protocol IEC 695-10-2 (1995-08) gave puncture diameter of 1.6 millimeters (mm). Typically, a value of less than 2 mm is desirable for most applications.

EXAMPLE 8

A blend of 25.9 parts of a first bisphenol A homopolycarbonate, 63.9 parts of a second, lower molecular weight bisphenol A homopolycarbonate with weight average molecular weight about 73% of that of the first bisphenol A homopolycarbonate, 4 parts of a commercially available bulk ABS copolymer, and 4.66 parts N,N'-bis[di-(2,3,6-trimethylphenyl)phosphoryl]piperazine was prepared by blending in a Henschel mixer followed by extrusion on a twin screw extruder and molded into test specimens. The blend also contained 1.5 parts conventional additives including polytetrafluoroethylene dispersed within styrene-acrylonitrile copolymer as an anti-drip agent. Molded test specimens at 0.06 inch thickness had a UL-94 rating of V-0.

EXAMPLE 9

A blend of 26.1 parts of a first bisphenol A homopolycarbonate, 64.05 parts of a second, lower molecular weight bisphenol A homopolycarbonate with weight average molecular weight about 75% of that of the first bisphenol A homopolycarbonate, 4.0 parts of a commercially available bulk ABS copolymer, and 4.3 parts XPP was prepared by blending in a Henschel mixer followed by extrusion on a twin screw extruder and molded into test specimens. The blend also contained 1.55 parts conventional additives including polytetrafluoroethylene dispersed within styrene-acrylonitrile copolymer as an anti-drip agent. Measurement of the Melt Volume Rate (260° C. and 5 kilograms applied weight) for the blend gave a value of 23 cubic centimeters per 10 minutes. Molded test parts 1.6 millimeters in thickness showed V-0 performance in the UL-94 protocol. A Ball Pressure Test run on test specimens at 125° C. according to test protocol IEC 695-10-2 (1995-08) gave puncture diameter of less than 2 millimeters. Molded test specimens passed the Glow Wire Test run according to test protocol IEC-695-2-1 at 960° C. on test specimens 1 millimeter in thickness.

EXAMPLE 10

A blend of 64.3 parts bisphenol A homopolycarbonate, 16 parts of a copolycarbonate comprising 45 mole % bisphenol A and 55 mole % 4,4'-(3,3,5-trimethylcyclohexylidene) diphenol (APEC 9371 obtained from Bayer Corp.); 4 parts of a commercially available high rubber graft ABS copolymer; 6 parts of a commercially available SAN copolymer, and 9 parts XPP was prepared by blending in a Henschel mixer followed by extrusion on a twin screw extruder and molded into test specimens. The blend also contained 0.7 parts of conventional additives including polytetrafluoroethylene dispersed within styrene-acrylonitrile copolymer as an anti-drip agent. The blend showed a glass transition temperature of 139° C. The observed FOT (total flameout times for first and second ignitions for 5 bars of 0.06 inch thickness) was 24 seconds.

EXAMPLE 11

The same composition of Example 10 was prepared except that 16 parts of a copolycarbonate comprising 65 mole % bisphenol A and 35 mole % 4,4'-(3,3,5-trimethylcyclohexylidene)diphenol (APEC 9351 obtained from Bayer Corp.) was used. The blend showed a glass transition temperature of 140° C. The observed FOT (total flameout times for first and second ignitions for 5 bars of 0.06 inch thickness) was 21 seconds.

EXAMPLE 12

Compositions containing 43.6 parts poly(2,6-dimethyl-1,4-phenylene ether) (0.40 IV) and 7.7 parts of a commercially available HIPS and glass fibers were prepared and molded under conditions similar to those of Example 1, using either XPP or BPADP as the flame retardant material. The compositions also contained 8 parts of a commercially available terpenephenol (NIREZ 2150 made by reacting limonene and phenol) and 0.75 parts conventional additives. In certain instances the compositions also contained clay (Huber 90G) or mica. The compositions and their properties are provided in Table V.

TABLE V

| Sample | 16 | 17 | 18 | 19 | 20 | 21 |
|---|---|---|---|---|---|---|
| glass fibers, parts | 20 | 20 | 15 | 15 | 15 | 15 |
| clay, parts | 0 | 0 | 5 | 5 | 0 | 0 |
| mica, parts | 0 | 0 | 0 | 0 | 5 | 5 |
| XPP, parts | 0 | 20 | 0 | 20 | 0 | 20 |
| BPADP, parts | 20 | 0 | 20 | 0 | 20 | 0 |
| UL-94 rating | V-1 | V-0 | V-0 | V-0 | V-0 | V-0 |
| HDT, ° C., 264 psi | 99 | 131 | 98 | 128 | 98 | 128 |
| specific gravity | 1.281 | 1.253 | 1.286 | 1.257 | 1.285 | 1.256 |

The compositions containing XPP had significantly higher HDT and lower specific gravity than comparable compositions containing BPADP.

EXAMPLE 13

Compositions containing poly(2,6-dimethyl-1,4-phenylene ether) (0.40 IV), a commercially available, low molecular weight hydrocarbon resin (ARKON P-125 available from Arakawa Chemical USA), 10 parts glass fibers, and 5 parts clay (Huber 90G) were prepared and molded under conditions similar to those of Example 1, using either XPP or BPADP as the flame retardant material. The compositions also contained 0.5 parts carbon black and 0.75 parts conventional additives. The compositions and their properties are provided, in Table VI.

TABLE VI

| Sample | 22 | 23 | 24 | 25 |
|---|---|---|---|---|
| PPE, parts | 62.25 | 62.25 | 56.25 | 56.25 |
| ARKON P-125, parts | 4 | 4 | 10 | 10 |
| XPP, parts | 18 | 0 | 18 | 0 |
| BPADP, parts | 0 | 18 | 0 | 18 |
| UL-94 rating | V-0 | V-0 | V-0 | V-1 |
| HDT, ° C., 264 psi | 152 | 112 | 135 | 102 |
| specific gravity | 1.215 | 1.258 | 1.220 | 1.256 |

The compositions containing XPP had significantly higher HDT and lower specific gravity than comparable compositions containing BPADP.

EXAMPLE 14

Compositions containing 61.25 parts poly(2,6-dimethyl-1,4-phenylene ether), 6.5 parts of a commercially available, low molecular weight hydrocarbon resin (ARKON P-125 available from Arakawa Chemical USA), 1.5 parts linear low density polyethylene, and glass fibers were prepared and molded under conditions similar to those of Example 1, using either XPP or BPADP as the flame retardant material. The compositions also contained 0.75 parts conventional additives. In certain instances the compositions also contained clay (Huber 90G) or mica. The compositions and their properties are provided in Table VII.

TABLE VII

| Sample | 26 | 27 | 28 | 29 | 30 | 31 |
|---|---|---|---|---|---|---|
| glass fibers, parts | 15 | 15 | 10 | 10 | 10 | 10 |
| clay, parts | 0 | 0 | 5 | 5 | 0 | 0 |
| mica, parts | 0 | 0 | 0 | 0 | 5 | 5 |
| XPP, parts | 0 | 15 | 0 | 15 | 0 | 15 |
| BPADP, parts | 15 | 0 | 15 | 0 | 15 | 0 |
| UL-94 rating | V-1 | V-0 | V-0 | V-0 | V-0 | V-0 |
| HDT, ° C., 264 psi | 127 | 149 | 124 | 147 | 126 | 146 |
| specific gravity | 1.224 | 1.201 | 1.225 | 1.200 | 1.228 | 1.205 |

The compositions containing XPP had significantly higher HDT and lower specific gravity than comparable compositions containing BPADP.

EXAMPLE 15

Compositions containing poly(2,6-dimethyl-1,4-phenylene ether) (0.33 IV), 5 parts mica (SUZORITE 200HK), and 15 parts glass fibers were prepared and molded under conditions similar to those of Example 1, using either XPP or RDP as the flame retardant material. The compositions also contained 8 parts of a commercially available terpenephenol (NIREZ 2150 made by reacting limonene and phenol), 0.5 parts carbon black, and 0.75 parts conventional additives. The compositions and their properties are provided in Table VIII.

TABLE VIII

| Sample | 32 | 33 |
|---|---|---|
| PPE, parts | 59.25 | 57.25 |
| XPP, parts | 0 | 14 |
| RDP, parts | 12 | 0 |
| UL-94 rating | V-0 | V-0 |
| HDT, ° C., 264 psi | 129 | 153 |
| specific gravity | 1.284 | 1.258 |

The compositions containing XPP had significantly higher HDT and lower specific gravity than comparable compositions containing RDP.

EXAMPLE 16

Bisphosphoramidates were prepared by the reaction of a corresponding tertiary diamine such as piperazine or N,N'-dimethylethylenediamine with a mixed diaryl chlorophosphate of the formula (ArO)(Ar'O)POCl in the presence of a tertiary amine as described in Talley, *J. Chem. Eng. Data*, 33, 221–222 (1988), the disclosure of which is incorporated by reference herein. Table IX shows the compositions of the phosphoramidates and their corresponding glass transition temperatures and melting points.

TABLE IX

| Phenol or phenol mixture | Composition | Tg, ° C. | Tm, ° C. |
|---|---|---|---|
| 2,6-xylenol | 100 | 62 | 192 |
| 2,4,6-trimethylphenol | 100 | 74 | 234–236 |
| phenol | 100 | 0 | 188–190 |
| 2,6-xylenol/ 2,4,6-trimethylphenol | 90/10 | 62 | 183–187 |
| 2,6-xylenol/ 2,4,6-trimethylphenol | 75/25 | 65 | 187–194 |
| 2,6-xylenol/ phenol | 90/10 | 59 | 179–194 |

EXAMPLE 17

Blends with compositions as in Example 1 containing about 71–77 parts of a bisphenol A homopolycarbonate, 6.5 parts of a commercially available high rubber graft ABS copolymer and 9 parts of a commercially available SAN copolymer are prepared under identical conditions by blending in a Henschel mixer followed by extrusion on a twin screw extruder and are molded into test specimens. The blends contain various amounts of phosphorus-containing flame retardants such that the total amount of phosphorus by weight in the composition is between about 1.01% and 1.04%. The blends also contain conventional additives including 0.4 part of polytetrafluoroethylene dispersed within styrene-acrylonitrile copolymer as an anti-drip agent. The following phosphoryl-based flame retardant additives are employed: a mixed aryloxy compound according to formula VI:

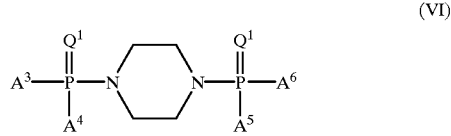

(VI)

wherein the A moiety is derived from a 90/10 mixture of 2,6-xylenol/phenol residues (hereinafter referred to as mixed aryloxy compound); N,N'-bis (neopentylenedioxy phosphoryl)piperazine (NPP), a compound of similar structure but wherein each pair of A moieties on each phosphorus atom (e.g. the $A^3$ and $A^4$ pair) is a bridging neopentyloxy residue; N,N'-bis (diphenyl phosphoryl)piperazine (PPP), a compound of similar structure but wherein each A moiety is a phenoxy residue; and resorcinol bis(diphenyl phosphate) (RDP) and bisphenol A bis(diphenyl phosphate) (BPADP), two conventional phosphate esters. The FOT (total flameout times for first and second ignitions for 5 bars of 0.125 inch thickness) and Tg of the polycarbonate phase of each test specimen are determined. The compositions containing the mixed aryloxy compound have an significantly reduced FOT and a Tg that differs by an acceptable increment from that of polycarbonate (147° C.) in a base composition as in Example 1 not containing a phosphoramide or phosphate ester. The composition containing the mixed aryloxy compound exhibits superior FOT as compared to the NPP-containing composition and shows a large increase in polycarbonate Tg as compared to the PPP-containing composition. The samples employing conventional flame retardants (FR) have lower Tg's than the corresponding Tg for the sample containing the mixed aryloxy compound. The variations in FR content in terms of phr of total FR and of phosphorus are not considered significant from the standpoint of properties.

EXAMPLE 18

In the same base composition used for Example 1, a composition was made containing 4.5 parts RDP and 5.7 of the mixed aryloxy compound of Example 17. The resultant composition has an acceptable flame out time. The glass transition temperature is higher for this composition that for the corresponding composition containing an amount of RDP alone with comparable level of total phosphorus by weight.

EXAMPLE 19

Blends of 62 parts of a commercially available poly(2,6-dimethyl-1,4-phenylene ether) and 38 parts of a commercially available HIPS are prepared and molded under identical conditions similar to those of Example 1. The blends also contain conventional additives including 0.21 part of a polytetrafluoroethylene/styrene-acrylonitrile copolymer as an anti-drip agent, which is not considered in determining proportions, and 20.5 phr of phosphoryl-based flame retardant additives: either RDP, BPADP, or the mixed aryloxy compound of Example 17. The FOT (total flameout times for first and second ignitions for 5 bars of 0.06 inch thickness) and heat deflection temperature (HDT) of each test specimen is determined. The composition containing the mixed aryloxy compound has acceptable FR properties and a significantly higher HDT than the compositions containing conventional FR additives.

EXAMPLE 20

This example demonstrates a method for preparing a phosphoramide of the present invention substantially free of acidic, basic, or halide impurities, or their precursors. A mixture of 2,6-xylenol (69.3 kg), magnesium chloride (2.075 kg), and phosphoryl chloride (44 kg) was mixed and gradually warmed in stages to 146° C. with stirring as hydrogen chloride was evolved. When an aliquot showed that the reaction was about 92% complete by nuclear magnetic resonance spectroscopy (NMR), an additional 1.1 kg of phosphoryl chloride was added. When an aliquot showed that the reaction was about 94% complete by NMR, an additional 2 kg of phosphoryl chloride was added. When an aliquot showed that the reaction was about 98% complete by NMR, an additional 1.1 kg of phosphoryl chloride was added, after which the temperature was lowered to about 120° C. The reaction mixture was sparged with nitrogen for several hours and then cooled to about 59° C. Methylene chloride (150 kg, containing less than 0.02 wt. % water) was added and the reaction mixture was filtered to remove solids. The filtrate was treated under nitrogen with piperazine (11.6 kg, containing less than 1 wt. % water), triethylamine (33.8 kg), and additional methylenechloride (34.5 kg, containing less than 0.02 wt. % water), after which the stirred reaction mixture was refluxed for about 10 hours. Additional methylenechloride (140 kg) was added and the reaction mixture was extracted twice with 1M hydrochloric acid, three times with water, and distilled to remove a portion of the methylenechloride and some residual water. The reaction mixture was treated with methanol at about 45° C., and then cooled, and filtered to isolate crystalline product. Analysis typically showed 90–92% yield of phosphoramide (XPP) containing less than 0.1 wt % X-PYRO.

COMPARATIVE EXAMPLE 21

This example demonstrates a method for preparing a phosphoramide in the presence of water which generates product not substantially free of acidic, basic, or halide impurities, or their precursors. To a suspension of sodium carbonate (6.2 g), triethyl amine (0.074 g), piperazine (2.5 g), and methylene chloride (60 ml) was added dixylyl chlorophosphate (20.1 g) in 40 ml methylene chloride over 45 minutes with vigorous stirring. The mixture was stirred vigorously for 2 hours, then heated to reflux for 23 hours. A high performance liquid chromatography (HPLC) sample shows a 37:33 area ratio of XPP to X-PYRO.

EXAMPLE 22

This example demonstrates a method for preparing X-PYRO. A 1500 mL, 3 neck, round bottom flask was equipped with a pressure equalizing addition funnel, overhead stirrer, and condenser. The flask was charged under nitrogen with 0.509 moles water, 1.01 moles triethyl amine, and 700 ml toluene. To the mixture was added a solution of 1.060 moles dixylyl chlorophosphate in 700 mL toluene drop-wise over 3 hours. The reaction mixture was stirred at room temperature for 24 hours, then washed with water. The organic layer was collected and evaporated. The solid product obtained was recrystallized twice using methanol and chloroform. The yield of X-PYRO was 80% (melting point 150° C.), and the purity was confirmed by HPLC and NMR.

EXAMPLE 23

Blends of 88 parts of a bisphenol A polycarbonate, 7 parts of a commercially available high rubber graft ABS copolymer and 5 parts of a commercially available SAN copolymer were prepared under identical conditions as for Example 1. The blends also contained conventional additives including 0.5 part of polytetrafluoroethylene dispersed within styrene-acrylonitrile copolymer as an anti-drip agent, which were not considered in determining proportions. The blends also contained various amounts of XPP mixed with X-PYRO. The blend formulations are given in Table X.

TABLE X

| Sample | 1 | 2 | 3 | 4 | 5 | 6 |
|---|---|---|---|---|---|---|
| XPP | 9.3 | 9.1 | 8.9 | 8.75 | 8.55 | 8.4 |
| X-PYRO | 0 | 0.2 | 0.4 | 0.55 | 0.75 | 0.9 |
| % X-PYRO in XPP | 0% | 2% | 4% | 6% | 8% | 10% |

FIG. 1 shows the normalized molecular weights for polycarbonate portions obtained from molded test parts of each blend exposed to 100% relative humidity and 100° C. for 24 hours. The data show that compositions with increasing levels of the X-PYRO impurity show accelerated molecular weight degradation for polycarbonate.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

What is claimed is:

1. A method for preparing a sterically hindered phosphoramide having a glass transition temperature in one embodiment of at least about 0° C., which comprises contacting a sterically hindered diaryl chlorophosphate with a basic nitrogen compound containing at least two basic N—H groups, wherein the reaction is conducted with substantial elimination of water such that less than about 2 wt. % of pyrophosphate is formed based on the weight of phosphoramide.

2. The method of claim 1 wherein less than about 1 wt. % of pyrophosphate is formed based on the weight of phosphoramide.

3. The method of claim 1 wherein less than about 0.5 wt. % of pyrophosphate is formed based on the weight of phosphoramide.

4. The method of claim 1 wherein less than about 0.2 wt. % of pyrophosphate is formed based on the weight of phosphoramide.

5. The method of claim 1 wherein less than about 0.5 wt. % of pyrophosphate is formed based on the weight of phosphoramide.

6. The method of claim 1 wherein the phosphoramide has the formula:

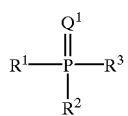

(I)

wherein:
Q¹ is oxygen or sulfur;
R¹ is an amine residue; and
R² and R³ are each independently an alkyloxy, alkylthio, aryloxy, or arylthio residue, or an aryloxy or arylthio residue containing at least one alkyl substitution; or an amine residue.

7. The method of claim 6 wherein the phosphoramide has a glass transition temperature of at least about 10° C.

8. The method of claim 6 wherein the phosphoramide has a glass transition temperature of at least about 20° C.

9. The method of claim 6 wherein the phosphoramide has the formula:

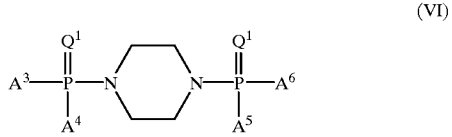

(VI)

wherein each $Q^1$ is independently oxygen or sulfur; and each of $A^{3-6}$ is independently an alkyloxy, alkylthio, aryloxy, or arylthio residue, or an aryloxy or arylthio residue containing at least one alkyl or halogen substitution, or mixture thereof; or an amine residue.

10. The method of claim 9 wherein the phosphoramide has a glass transition point of at least about 10° C.

11. The method of claim 9 wherein the phosphoramide has a glass transition point of at least about 20° C.

12. The method of claim 9 wherein each $Q^1$ is oxygen; and each of $A^{3-6}$ is an aryloxy moiety with at least one aryloxy moiety having at least one substituent on an aromatic ring ortho to the oxygen linkage.

13. The method of claim 12 wherein each substituent is a $C_{1-8}$ straight-chain or branched alkyl, or halogen.

14. The method of claim 9 wherein each $Q^1$ is oxygen; and each of $A^{3-6}$ is independently an aryloxy moiety with at least one substituent on each aromatic ring ortho to the oxygen linkage.

15. The method of claim 14 wherein each substituent is a $C_{1-8}$ straight-chain or branched alkyl, or halogen.

16. The method of claim 9 wherein each $Q^1$ is oxygen; and each of $A^{3-6}$ is independently an aryloxy moiety with at least two substituents on each aromatic ring ortho to the oxygen linkage.

17. The method of claim 16 wherein each substituent is a $C_{1-8}$ straight-chain or branched alkyl, or halogen.

18. The method of claim 9 wherein each $Q^1$ is oxygen; and each of $A^{3-6}$ is independently phenoxy, 2-methylphenoxy, 2,6-dimethylphenoxy, 2,3,6-trimethylphenoxy, or 2,4,6-trimethylphenoxy.

19. A resin composition comprising the following and any reaction products thereof:
a) at least one thermoplastic resin, and
b) at least one phosphoramide having a glass transition point of at least about 0° C., wherein the phosphoramide is made by the method of claim 1.

20. A resin composition comprising the following and any reaction products thereof:
a) at least one thermoplastic resin, and
b) at least one phosphoramide having a glass transition point of at least about 0° C., wherein the phosphoramide is made by the method of claim 6.

21. A resin composition comprising the following and any reaction products thereof:
a) at least one thermoplastic resin, and
b) at least one phosphoramide having a glass transition point of at least about 0° C., wherein the phosphoramide is made by the method of claim 9.

22. The composition of claim 19 wherein the thermoplastic resin is selected from the group consisting of (i) polycarbonate resins and blends containing at least one polycarbonate resin, (ii) polyphenylene ether resins and blends containing at least one polyphenylene ether resin, (iii) polystyrene resin and blends containing polystyrene resin, (iv) styrene-containing copolymer resin and blends containing styrene-containing copolymer resin; (v) styrene-containing graft copolymer resin and blends containing styrene-containing graft copolymer resin; and (vi) high impact polystyrene resin and blends containing high impact polystyrene resin.

23. The composition of claim 19 wherein the thermoplastic resin is selected from the group consisting of high impact polystyrene resin, syndiotactic polystyrene, polyphenylene ether/high impact polystyrene resin blends, polyphenylene ether/syndiotactic polystyrene resin blends, polycarbonate-SAN blends, polycarbonate-ABS blends, polycarbonate-SAN-ABS blends, and polycarbonate-polyester blends.

24. The composition of claim 19 wherein the thermoplastic resin is at least one of polycarbonates, polyphenylene ethers, high impact polystyrenes, syndiotactic polystyrenes, acrylonitrile-butadiene-styrene copolymers, and styrene-acrylonitrile copolymers.

25. The composition of claim 19 wherein the thermoplastic resin comprises at least one polycarbonate and ABS.

26. The composition of claim 25 wherein the at least one polycarbonate comprises bisphenol A polycarbonate and a copolycarbonate of bisphenol A and 4,4'-(3,3,5-trimethylcyclohexylidene)diphenol.

27. The composition of claim 19 wherein the at least one phosphoramide comprises a phosphoramide of the formula VI:

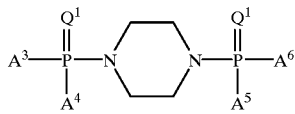

(VI)

wherein each $Q^1$ is oxygen; and each A moiety is a 2,6-dimethylphenoxy moiety.

28. The composition of claim 27 wherein the phosphoramide is present in an amount effective to render the resin composition a flame rating of V-0, V-1, or V-2 in the Underwriter's Laboratory UL-94 protocol when measured on a test specimen of about 0.125 inch by about 0.5 inch by about 5 inch dimensions.

29. The composition of claim 19 wherein the thermoplastic resin comprises polyphenylene ether and high impact polystyrene resin.

30. The composition of claim 19 further comprising at least one non-polymeric or polymeric phosphorus additive selected from the group consisting of organic phosphate esters, thiophosphate esters, phosphonate esters, thiophosphonate esters, phosphinate esters, thiophosphinate esters, phosphine oxides, and thiophosphine oxides.

31. The composition of claim 30 in which the phosphorus additive is an organic phosphate ester.

32. The composition of claim 31 wherein the combination of phosphoramide and organic phosphate ester is present in an amount effective to render the resin composition a flame rating of V-0, V-1, or V-2 in the Underwriter's Laboratory UL-94 protocol when measured on a test specimen of about 0.125 inch by about 0.5 inch by about 5 inch dimensions.

33. The composition of claim 19 wherein the total amount of phosphorus per 100 parts of resinous materials is in the range of about 0.008–3 parts by weight.

34. The composition of claim 19 wherein the total amount of phosphorus per 100 parts of resinous materials is in the range of about 0.1–3 parts by weight.

35. An article made from the composition of claim 19.

36. The article of claim 35 which is a deflection yoke for cathode ray tube, deflection yoke for television, slit type deflection yoke, mold coil deflection yoke, television backplate, docking station, pedestal, bezel, pallet, switch, switch housing, plug, plug housing, electrical connector, connecting device, socket, television housing, computer housing, desk-top computer housing, portable computer housing, lap-top computer housing, palm-held computer housing; monitor housing, printer housing, keyboard, FAX machine housing, copier housing, telephone housing, mobile phone housing, radio sender housing, radio receiver housing, light fixture, battery charger housing, battery housing, automotive electrical component, antenna housing, transformer housing, modem, cartridge, network interface device housing, circuit breaker housing, meter housing, panel for wet or dry appliance, dishwasher panel, clothes washer panel, clothes dryer panel, refrigerator panel; heating or ventilation enclosure, fan, air conditioner housing, cladding or seating for public transportation; or cladding or seating for trains, subways, or buses.

37. A method for preparing a sterically hindered phosphoramide of the formula:

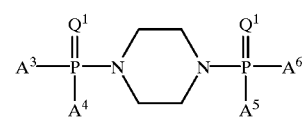

(VI)

having a glass transition temperature of at least about 0°C., wherein each $Q^1$ is oxygen; and each of $A^{3-6}$ is independently an aryloxy moiety with at least two substituents on each aromatic ring ortho to the oxygen linkage, which comprises contacting at least one sterically hindered diaryl chlorophosphate with piperazine, wherein the reaction is conducted with substantial elimination of water such that less than about 2 wt. % of pyrophosphate is formed based on the weight of phosphoramide.

38. The method of claim 37 wherein less than about 1 wt. % of pyrophosphate is formed based on the weight of phosphoramide.

39. The method of claim 37 wherein each substituent is a $C_{1-8}$ straight-chain or branched alkyl, or halogen.

40. The method of claim 37 wherein each $Q^1$ is oxygen; and each of $A^{3-6}$ is independently 2,6-dimethylphefloxy, 2,3,6-trimethylphenoXy, or 2,4,6 -trimethylphenoxy.

41. The method of claim 37 wherein each $Q^1$ is oxygen; and each of $A^{3-6}$ is 2,6-dimethylphenoxy.

42. A resin composition comprising the following and any reaction products thereof:

a) at least one thermoplastic resin selected from the group consisting of (i) polycarbonate resins and blends containing at least one polycarbonate resin, (ii) polyphenylene ether resins and blends containing at least one polyphenylene ether resin, (iii) polystyrene resin and blends containing polystyrene resin, (iv) styrene-containing copolymer resin and blends containing styrene-containing copolymer resin; (v) styrene-containing graft copolymer resin and blends containing styrene-containing graft copolymer resin; and (vi) high impact polystyrene resin and blends containing high impact polystyrene resin, and b) at least one phosphoramide of the formula:

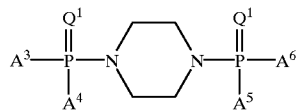

(VI)

having a glass transition temperature of at least about 0° C., wherein each $Q^1$ is oxygen; and each of $A^{3-6}$ is independently an aryloxy moiety with at least two substituents on each aromatic ring ortho to the oxygen linkage, wherein the phosphoramide is made by the method of claim 37.

43. The composition of claim 42 wherein the thermoplastic resin is selected from the group consisting of high impact polystyrene resin, syndiotactic polystyrene, polyphenylene ether/high impact polystyrene resin blends, polyphenylene ether/syndiotactic polystyrene resin blends, polycarbonate-SAN blends, polycarbonate-ABS blends, polycarbonate-SAN-ABS blends, and polycarbonate-pOlyester blends.

44. The composition of claim 43 wherein the thermoplastic resin comprises at least one polycarbonate and ABS.

45. The composition of claim 44 wherein the polycarbonate comprises at least one of bisphenol A polycarbonate or a copolycarbonate of bisphenol A and 4,4'-(3,3,5-trimethylcyclohxylidene)diphenol.

46. The composition of claim 42 wherein the at least one phosphoramide comprises a phosphoramide of the formula VI:

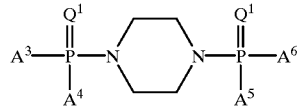

(VI)

wherein each $Q^1$ is oxygen; and each A moiety is a 2,6-dimethyiphenoxy moiety.

47. The composition of claim 46 wherein the phosphoramide is present in an amount effective to render the resin composition a flame rating of V-0, V-1, or V-2 in the Underwriter's Laboratory UL-94 protocol when measured on a test specimen of about 0.125 inch by about 0.5 inch by about 5 inch dimensions.

48. The composition of claim 42 wherein the total amount of phosphorus per 100 parts of resinous materials is in the range of about 0.008–3 parts by weight.

* * * * *